US010330172B2

(12) United States Patent
Brown et al.

(10) Patent No.: US 10,330,172 B2
(45) Date of Patent: Jun. 25, 2019

(54) VEHICULAR VIBRATION ISOLATION APPARATUS

(71) Applicant: Ford Global Technologies, LLC, Dearborn, MI (US)

(72) Inventors: Todd Allen Brown, Franklin, MI (US); Russ Lee Norton, Brownstown Township, MI (US); Eric Hongtei Tseng, Canton, MI (US); Vladimir V. Kokotovic, Dearborn, MI (US); Davor Hrovat, Ann Arbor, MI (US); Donald Margolis, El Macero, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/440,782

(22) Filed: Feb. 23, 2017

(65) Prior Publication Data

US 2018/0238416 A1    Aug. 23, 2018

(51) Int. Cl.
| | | |
|---|---|---|
| *F16F 13/00* | (2006.01) | |
| *F16F 15/027* | (2006.01) | |
| *B60G 13/08* | (2006.01) | |
| *B60K 5/12* | (2006.01) | |
| *B62D 7/22* | (2006.01) | |

(Continued)

(52) U.S. Cl.
CPC .......... *F16F 15/027* (2013.01); *B60G 13/003* (2013.01); *B60G 13/08* (2013.01); *B60K 5/1216* (2013.01); *B62D 7/22* (2013.01); *F16F 9/10* (2013.01); *F16F 9/3207* (2013.01); *F16F 9/34* (2013.01); *F16F 9/53* (2013.01); *F16F 9/54* (2013.01); *F16F 13/106* (2013.01);
(Continued)

(58) Field of Classification Search
CPC .......... F16F 13/08; F16F 13/085; F16F 13/10; F16F 13/102; F16F 13/105; F16F 13/106; F16F 13/107; F16F 13/16; F16F 13/30; F16F 13/305

See application file for complete search history.

(56) References Cited

U.S. PATENT DOCUMENTS

| | | | | |
|---|---|---|---|---|
| 4,657,232 A | * | 4/1987 | West | F16F 13/26 |
| | | | | 267/140.13 |
| 4,720,087 A | * | 1/1988 | Duclos | F16F 13/30 |
| | | | | 188/267.1 |

(Continued)

FOREIGN PATENT DOCUMENTS

| | | | | |
|---|---|---|---|---|
| EP | 0271848 A2 | * | 6/1988 | ............... F16F 13/30 |
| GB | 2282430 A | * | 4/1995 | ............ F16F 13/105 |

OTHER PUBLICATIONS

Machine translation of EP 0271848 (no date).*

(Continued)

*Primary Examiner* — Nicholas J Lane
(74) *Attorney, Agent, or Firm* — Ray Coppiellie; Hanley, Flight & Zimmerman, LLC

(57) ABSTRACT

A hydraulic mount for a vehicle shock absorber includes a first housing portion, a second housing portion, an orifice plate and a diaphragm connected together to define a first chamber and a second chamber in the hydraulic mount. A first resilient member disposed on the orifice plate defines a first sub-chamber in the first chamber and a second resilient member disposed on the orifice plate defines a second sub-chamber in the second chamber.

20 Claims, 14 Drawing Sheets

(51) Int. Cl.
   *F16F 9/10* (2006.01)
   *F16F 9/32* (2006.01)
   *F16F 9/34* (2006.01)
   *F16F 9/53* (2006.01)
   *F16F 15/03* (2006.01)
   *B60G 13/00* (2006.01)
   *F16F 9/54* (2006.01)
   *F16F 13/10* (2006.01)

(52) U.S. Cl.
   CPC .......... *F16F 15/03* (2013.01); *B60G 2202/24* (2013.01); *B60G 2204/128* (2013.01); *F16F 2222/12* (2013.01)

(56) References Cited

U.S. PATENT DOCUMENTS

| | | | | |
|---|---|---|---|---|
| 4,861,006 A * | 8/1989 | Takano | ................... | F16F 13/30 188/267.1 |
| 4,925,162 A * | 5/1990 | Kojima | ................. | F16F 13/106 267/122 |
| 5,029,823 A * | 7/1991 | Hodgson | ................. | F16F 13/10 267/140.14 |
| 5,052,510 A | 10/1991 | Gossman | | |
| 5,112,032 A * | 5/1992 | Klein | .................... | F16F 13/105 180/312 |
| 5,273,261 A | 12/1993 | Hamberg et al. | | |
| 6,412,761 B1 * | 7/2002 | Baudendistel | ........ | F16F 13/105 267/140.14 |
| 7,118,100 B2 * | 10/2006 | Tewani | ................. | F16F 13/305 267/140.15 |
| 2005/0046137 A1 | 3/2005 | Dreff | | |
| 2005/0173211 A1 * | 8/2005 | Hopkins | ................. | F16F 13/10 188/267 |

OTHER PUBLICATIONS

Urbaniak, Christopher Roman, "Conceptualisation and Analysis of an Automotive Shock Absorber with Integrated Hydraulic Mount," Master's Thesis, University of Waterloo, Waterloo, Ontario, Canada, 2006, 117 pages.
Continental, "Optimum Damping Through Hydraulic Resistance," ContiTech Press Release, Shanghai, Oct. 2014, 3 pages.
Adiguna et al., "Transient response of a hydraulic engine mount," Journal of Sound and Vibration 268 (2003) 217-248, 32 pages.

* cited by examiner

VEHICULAR VIBRATION ISOLATION APPARATUS

FIELD OF THE DISCLOSURE

This disclosure relates generally to shock absorbers and, more particularly, to vehicle shock absorbers used in suspension and steering systems.

BACKGROUND

FIG. 1A shows an example vehicle 100 having a suspension system using shock absorbers (e.g., telescopic dampers) 110. The shock absorbers 110 regulate suspension movement and help to maintain the wheels 120 in contact with the ground at all times, as well as reduce bounce, roll and pitch. The shock absorbers 110 also help to reduce brake dive, acceleration squat and to dampen or isolate road induced disturbances having a low frequency (e.g., between about 0 Hz-30 Hz) and a high amplitude. Conventional shock absorbers isolate vibrations related to vehicle wheel and body excitation inputs in the range of about 5-14 Hz, with higher frequency excitation inputs having smaller amplitudes being transmitted to the vehicle structure.

In various suspension system configurations, the shock absorbers 110 may be integrated with struts and coils (e.g., MacPherson struts in a MacPherson front suspension, etc.) or may be provided separately thereto (e.g., coil spring suspension system). For example, in coil spring suspension systems, the shock absorber is connected at a first end to the chassis or frame and at another end to the upper control arm (e.g., short-arm) or the lower control arm (e.g., long-arm), which are connected to a wheel hub via wheel spindles and ball joints. A coil spring works against one of the control arms (e.g., lower control arm for Type 1 Coil Spring or double wishbone suspension, upper control arm for Type 2 Coil Spring) to support the weight of the vehicle via a ball joint (e.g., via the lower ball joint in the Type 1 Coil Spring or via the upper ball joint in the Type 2 Coil Spring), and the shock absorber controls spring oscillations. In MacPherson strut suspensions, the upper control arm is omitted. A corner assembly including a strut, spring and shock absorber is disposed to connect the shock absorber, at a first end, to the vehicle body, at the other end, to a ball joint at the lower control arm. In a MacPherson strut suspension, the strut bears the load of the vehicle weight.

Shock absorbers 110 are conventionally selected to provide a desired response (e.g., compression and rebound performance) and balance to address primary ride perturbations affecting rigid body motion of the passenger compartment relative to the road, arising from high-amplitude, low-frequency events, such as potholes and speed bumps. Shock absorbers 110 typically have to trade off among various ride objectives/performances and have difficulty addressing high frequency disturbances when the road noise amplitude is low. The challenge largely comes from the inherent friction in the shock absorbers.

FIG. 1B shows an example truck 130 using shock absorbers 140 as steering stabilizers or steering dampers. Shock absorbers 140 help dampen lateral or side-to-side movement in a vehicle's suspension to reduce vibration, steering wobble or shimmy and bump steer and to make heavier vehicles (e.g., trucks, RV's, etc.) easier to drive over rough terrain as well as at highway speeds, particularly if the vehicle is heavily laden or towing a load.

FIG. 2 shows a hydraulic engine mount (HEM) 200, which is disposed between an engine and a frame of a vehicle to isolate vibration from the engine and reduce the engine vibration felt inside the vehicle. The HEM 200 is mounted to the engine through the top mounting studs 201 and to the frame through the bottom mounting studs 202. The HEM 200 includes metal inserts 203, 204 to support the forces and torques generated by the engine and an elastomeric element 205 or matrix to dampen vibrations and enable compression and shear displacement or elastic deformation. An upper chamber 207 and a lower chamber 208 are filled with an operating fluid comprising a mixture of ethylene glycol (anti-freeze) and distilled water. Upon compression of the upper chamber 207, the operating fluid is forced to flow through fluid pathways in an orifice plate 211. A first fluid pathway is formed by inertia tracks 212, which are long channels having a small cross-sectional area to provide a high level of fluid damping or resistance to fluid flow to control, for example, engine resonances. A second fluid pathway is formed by a decoupler 213, a free-floating, thin disk disposed in the orifice plate 211 to move between a top portion and a bottom portion of the orifice plate 211 and to occlude orifices 214 in the orifice plate 211 at those positions. The orifice plate 211 positioned between the upper chamber 207 and lower chamber 208 controls the fluid system characteristics. Minor changes in the geometry and flow conditions of the orifice plate 211 can significantly influence dynamic behavior. A flexible diaphragm 215 functions as an accumulator as the fluid flows from the upper chamber 207 to the lower chamber 208. A vent 216 allows air to escape from a base plate 217 responsive to movement of the flexible diaphragm 215.

SUMMARY

In one example, a hydraulic mount for a vehicle shock absorber includes a first housing portion, a second housing portion, an orifice plate and a diaphragm connected together to define a first chamber and a second chamber in the hydraulic mount. A first resilient member disposed on the orifice plate defines a first sub-chamber in the first chamber and a second resilient member disposed on the orifice plate defines a second sub-chamber in the second chamber.

In another example, a vehicular shock absorbing apparatus includes a shock absorber and a hydraulic mount operatively coupled with the shock absorber, the hydraulic mount including a first resilient member and a second resilient member, and a diaphragm, the hydraulic mount defining a first chamber and a second chamber, the first resilient member defining a first sub-chamber in the first chamber and the second resilient member defining a second sub-chamber in the second chamber.

While the present disclosure is susceptible to various modifications and alternative forms, specific examples are shown and described herein. It should be understood, that the present disclosure is not limited to the particular forms and examples disclosed and instead covers all modifications, equivalents, embodiments, and alternatives falling within the spirit and scope of the present disclosure.

DETAILED DESCRIPTION

Disclosed herein are example hydraulic mounts for a vehicular shock absorber, such as used in a vehicle suspension system or a vehicle steering system, and example shock absorbers incorporating such example hydraulic mounts. The disclosed hydraulic mounts and shock absorbers including such hydraulic mounts enable the creation of a passive broadband shock absorber addressing both lower frequency (e.g., 0-30 Hz) and higher frequency (e.g., 30-100 Hz) vibrations affecting ride comfort, generally denoted as Noise, Vibration and Harshness (NVH). In some examples, the hydraulic mounts disclosed herein are tuned to isolate frequencies of vibration between about 20-30 Hz and about 100-200 Hz to isolate vibrations having a higher frequency and lower amplitude than the vibrations to which the shock absorber is tuned to isolate. Conventional shock absorbers isolate vibrations related to vehicle wheel and body frequencies in the range of about 5-14 Hz. Higher frequency excitation inputs with smaller amplitudes are typically transmitted to the vehicle structure.

Figure 1A:
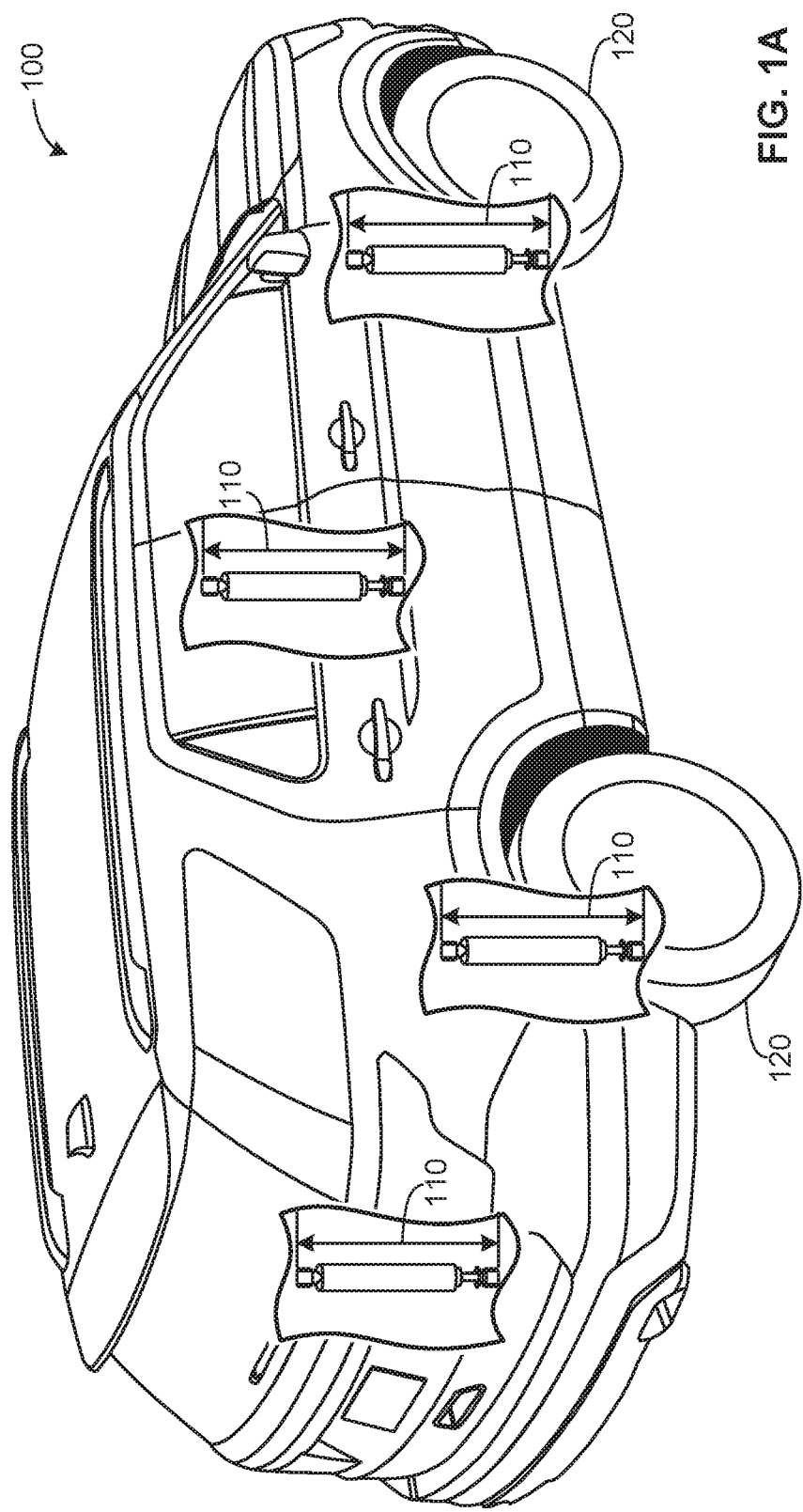
FIG. 1A depicts an example passenger vehicle suspension with conventional shock absorbers.
Figure 1B:
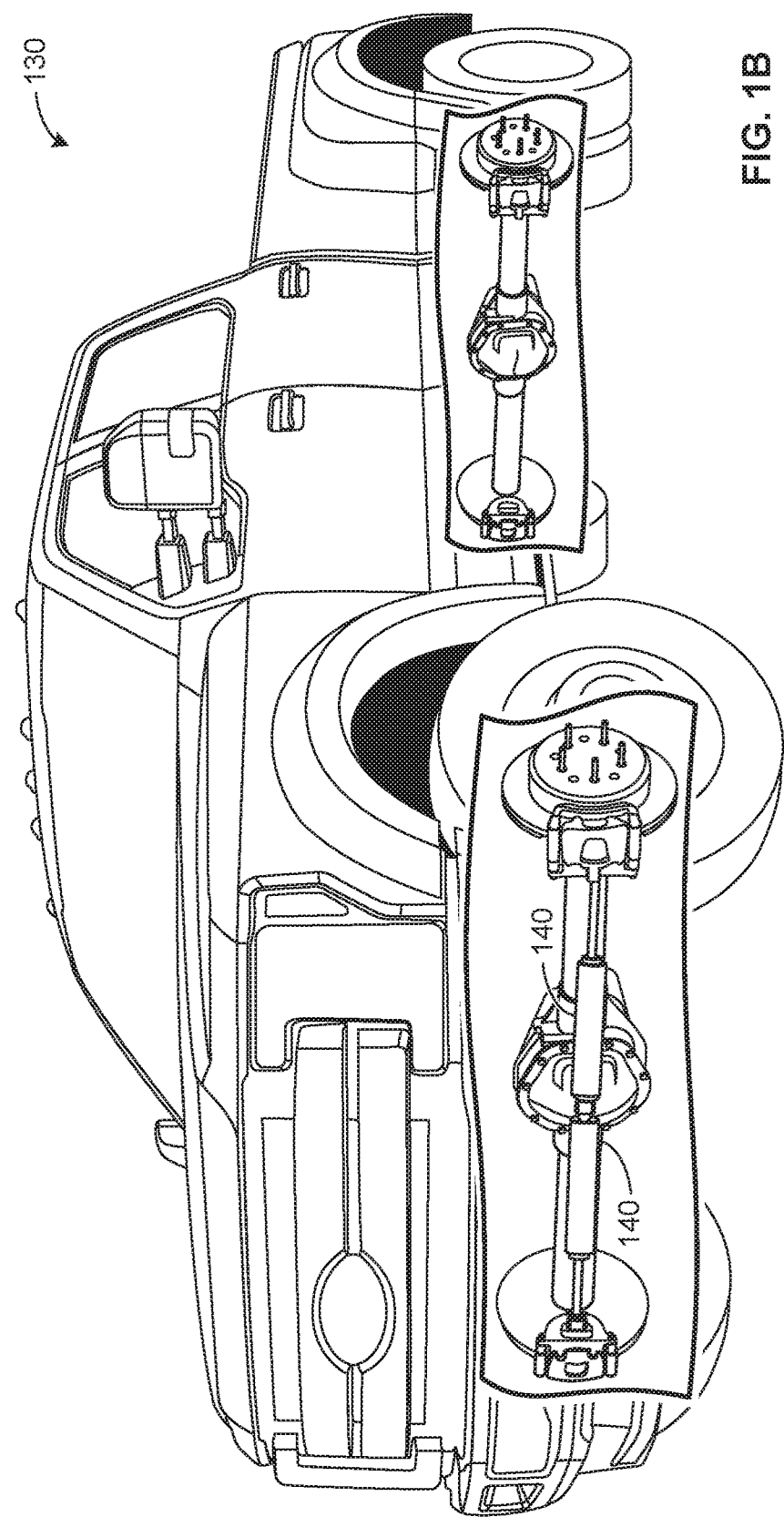
FIG. 1B depicts an example truck with conventional shock absorbers used as a steering stabilizer.
Figure 2:
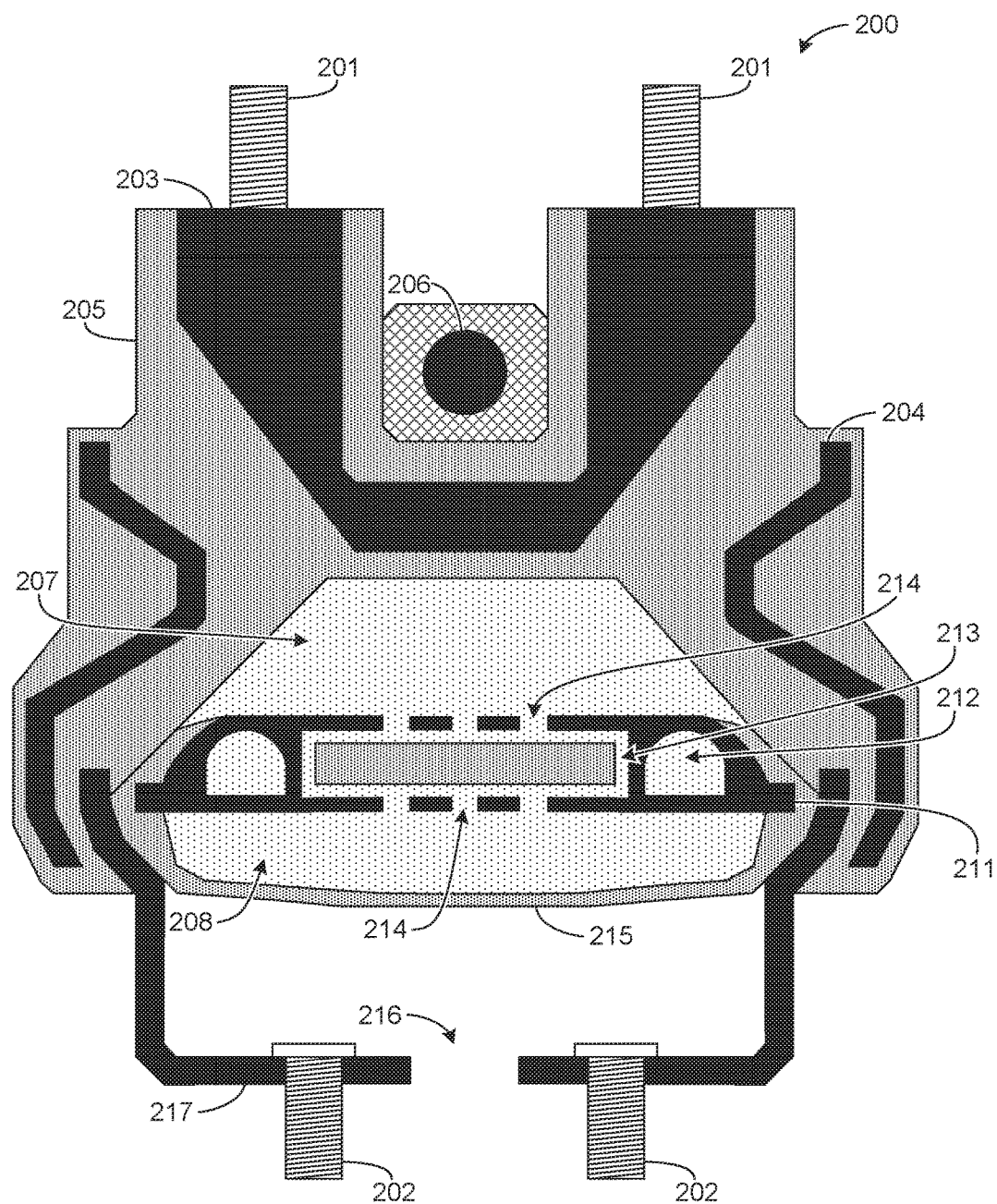
FIG. 2 is an example conventional passive hydraulic engine mount.

The example hydraulic mounts and example shock absorbers using such hydraulic mounts disclosed herein facilitate substantial isolation of small vibrations regardless of the initial motion direction of the shock absorber to isolate vibrations impacting secondary ride. Some of the example hydraulic mounts are specifically configured to account for initial positioning of decouplers within the hydraulic mount. A conventional HEM, such as the HEM shown in FIG. 2, facilitates hydraulic fluid flow between the upper chamber 207 and lower chamber 208 when the decoupler 213 is floating between the top and bottom portions of the orifice plate under the influence of cyclic engine vibrations of small magnitude and high frequency. Given the function and operation of the HEM 200, an initial position of the decoupler 213 is irrelevant. However, for the example hydraulic mounts disclosed herein that use a decoupler and that are used in a shock absorber, a proper initial position of the decoupler is important to guarantee immediate flow and operability.

Figure 3:
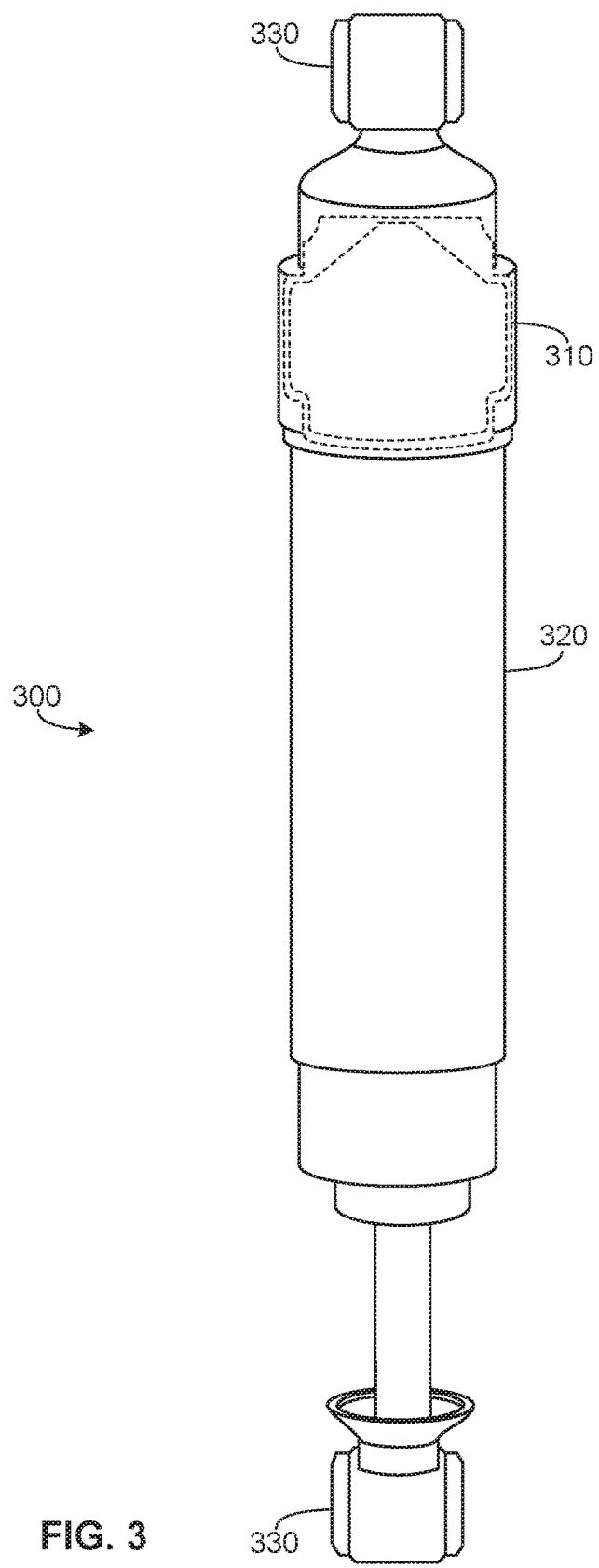
FIG. 3 is the example shock absorbing apparatus having an example hydraulic mount in accordance with teachings of this disclosure.

FIG. 3 illustrates an example environment of use 300 in which a hydraulic mount 310, examples of which are shown in FIGS. 4-11, is integrated with a shock absorber 320 to provide, in combination, a dampening function over a frequency range of interest (e.g., 0-100 Hz, 0-200 Hz, etc.). Example shock absorber mounts 330 are provided at each end of the shock absorber 320 to secure the shock absorber 320 to corresponding vehicle mounts, brackets, or components appropriate to the shock absorber configuration and application (e.g., a suspension shock absorber, a steering shock absorber, etc.). While ring mounts or eye/eyelet shock absorber mounts 330 are shown, alternative mounts could include, for example, a bar mounting, a bushing and stud, a bayonet/stud/pin mount for a bolt-to-nut connection, or the like.

Figure 4:
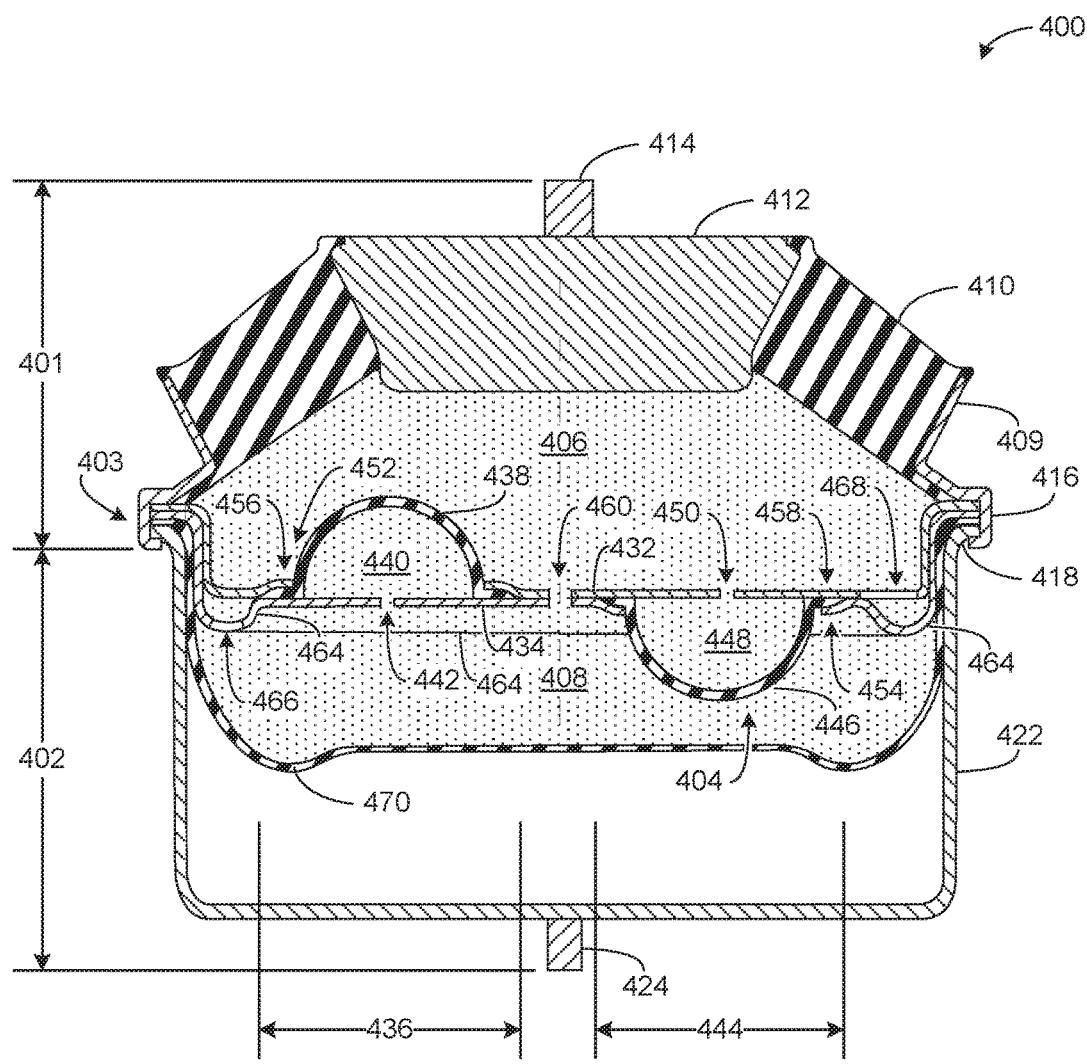
FIG. 4 is a first example hydraulic mount that may be used in the example shock absorbing apparatus of FIG. 3 in accordance with teachings of this disclosure.

FIG. 4 illustrates an example hydraulic mount 400 that may be integrated with a shock absorber, such as the example shock absorber 320 of FIG. 3. The hydraulic mount 400 includes a first housing portion 401 (e.g., an upper portion in the example of FIG. 4) and a second housing portion 402 (e.g., a lower portion in the example of FIG. 4) connected to form a hydraulic seal 403 to retain a first operating fluid 404 within the hydraulic mount 400. The first operating fluid 404 provides a dampening function within the hydraulic mount 400 and moves between a first chamber 406 and a second chamber 408 defined in the hydraulic mount 400 responsive to pressure differentials generated across the first and second chambers 406, 408.

The example first housing portion 401 shown in FIG. 4 includes an example outer housing portion 409 formed from a metal or metal alloy such as, for example, a steel alloy or aluminum, or from a composite material. An example annular rubber main spring 410 is disposed within, and connected or bonded to, the outer housing portion 409 as a compliance member. An example first mount 412 is disposed within the annular rubber main spring 410. The first mount 412 includes an example first connector 414 (e.g., a threaded stud, mechanical fastener, etc.) to facilitate connection of the hydraulic mount 400 to another component, such as a supporting bracket. In one example, the hydraulic mount 400 is integrated with a shock absorber, such as the example shock absorber 320 of FIG. 3, and the first connector 414 connects to a base portion of a shock absorber mount 330.

The first housing portion 401 includes, at an end opposite to that of the first mount connector 414, an example second connector 416 to facilitate connection of the first housing portion 401 to a corresponding mating third connector 418 of the second housing portion 402 to form the hydraulic seal 403. In the example shown in FIG. 4, the second connector 416 is an inwardly-directed annular channel into which the example third connector 418, an outwardly-directed flange, is received and retained, under compression, to form the hydraulic seal 403. In another example, the second connector 416 includes an outwardly-directed annular channel into which the third connector 418 is received and retained, under compression, to form the hydraulic seal 403. In still another example, the second connector 416 includes an outwardly directed flange dimensioned to engage an inwardly-directed annular channel of the third connector 418. In yet another example, the second connector 416 and the third connector 418 include mating threaded connections. In some examples, the second connector 416 and the third connector 418 include mating flanges connected by mechanical fasteners (e.g., bolts/nuts, etc.). In some examples, the hydraulic seal 403 is formed by brazing or welding the second connector 416 and the third connector 418.

The example second housing portion 402 shown in FIG. 4 includes an example outer housing portion 422 formed from a metal or metal alloy such as, for example, a steel alloy or aluminum, or from a composite material. The outer housing portions 409, 422 may be formed from the same material(s) or from different material(s). An end portion of the outer housing portion 422 opposite the end bearing the third connector 418 includes an example fourth connector 424 (e.g., a threaded stud, mechanical fastener, etc.) to facilitate connection of the hydraulic mount 400 to another component, such as a supporting bracket. In one example, the hydraulic mount 400 is integrated with a shock absorber, such as the example shock absorber 320 of FIG. 3, and the example fourth connector 424 is operatively connected to a piston rod (not shown) of a shock absorber.

The compression fit connection between the second connector 416 and the third connector 418 secures outer circumferential portions of an example orifice plate 430 including an example first plate 432 and an example second plate 434. In some examples, the orifice plate 430 is a unitary structure rather than a separate first plate 432 and second plate 434.

In a first portion 436 of the orifice plate 430, a first resilient member 438 is secured to the first plate 432 to define a first sub-chamber 440 within the first chamber 406. As shown in FIG. 4, a first orifice 442 in the first portion 436 of the orifice plate 430 is to permit passage of the first operating fluid 404 between the first sub-chamber 440 and the second chamber 408. In a second portion 444 of the orifice plate 430, a second resilient member 446 is secured to the second plate 434 to define a second sub-chamber 448 within the second chamber 408. As shown in FIG. 4, a second orifice 450 in the second portion 444 of the orifice plate 430 is to permit passage of the first operating fluid 404 between the second sub-chamber 448 and the first chamber 406.

In some examples, the first resilient member 438 and the second resilient member 446 are similar in at least one of size, thickness and/or material and may possess the same elastic modulus. In some examples, the first resilient member 438 and the second resilient member 446 are dissimilar in size and/or material, and possess different elastic modulus. The first resilient member 438 and/or the second resilient member 446 may be formed of an elastomeric material such as a natural rubber or a synthetic rubber such as, but not limited to, an ethylene propylene (EPR), and ethylene propylene diene terpolymer (EPDM), a neoprene, a styrene-butadiene rubber (SBR), a silicone rubber, a butyl rubber, a chlorosulfonated polyethylene (CSPE) synthetic rubber, a fluorosilicone (FSI) rubber, a nitrile (NBR), a hydrogenated nitrile (HNBR), a polyacrylate (ACM), or an epichlorohydrin copolymer (ECO).

In some examples, the first resilient member 438 and the second resilient member 446 are generally hemispherical in profile, with a flanged base portion to facilitate securement to the first plate 432 and/or the second plate 434. For example, as shown in the example of FIG. 4, the first resilient member 438 includes a flange 452 and the second resilient member 446 includes a flange 454. In the example shown, the flange 452 is secured to the orifice plate 430 via an example joint 456 and the flange 454 is secured to the orifice plate 430 via an example joint 458. The example joints 456, 458 may include, for example, a compression joint with the flanges 452, 454 being compressed between opposing portions of the first plate 432 and the second plate 434 or an adhesive joint having adhesive applied to bond the flanges 452, 454 to the first plate 432 and the second plate 434. In some examples, the joints 456, 458 may include a joggle lap joint, a single lap joint or a double lap joint. In some examples, surfaces of the flanges 452, 454 contacting the first plate 432 and/or the second plate 434 may include surface features (e.g., protuberances, surface treatments, beaded flange, etc.) to facilitate securement between the flanges 452, 454, the first plate 432 and the second plate 434.

Further to the first orifice 442 and second orifice 450 noted above, the first chamber 406 is also in fluid communication with the second chamber 408 via a third orifice 460 formed in the orifice plate 430 in areas outside of the first portion 436 and the second portion 444. For example, in FIG. 4, the third orifice 460 is formed in a central portion of the orifice plate 430 to permit passage of the first operating fluid 404 between the first chamber 406 and the second chamber 408.

Fluid communication between the first chamber 406 and the second chamber 408 is also accomplished via an inertia track 464 defined by the first plate 432 and/or the second plate 434. The inertia track 464 defines a channel (e.g., an annular channel, etc.) extending along the orifice plate 430 (e.g., along an outer circumferential portion of the orifice plate 430, etc.) to provide a damping or resistance to fluid flow. A first opening 466 is formed in a first portion of the inertia track 464 to open the inertia track 464 to the second chamber 408 to thereby permit passage of the first operating fluid 404 between the inertia track 464 and the second chamber 408. A second opening 468 is formed in a second portion of the inertia track 464 to open the inertia track 464 to the first chamber 406 to thereby permit passage of the first operating fluid 404 between the inertia track 464 and the first chamber 406.

In some examples, the second opening 468 is formed in the orifice plate 430 (e.g., in the first plate 432) opposite to (e.g., circumferentially spaced 180° relative to) the first opening 466 to force the first operating fluid 404 to move through the inertia track 464 from one side of the orifice plate 430 to the opposite side of the orifice plate 430, such as is shown in the example of FIG. 4. The inertia track 464 may include one or more straight or curvilinear sections and may include one or more flow restrictors (e.g., a reduced cross-sectional area, bumps in the flow path, etc.). Although a cross-sectional profile in the illustrated example of an inertia track 464 is substantially semi-circular, one or more other cross-sectional profiles (e.g., elliptical, rectangular, etc.) may be used along an entire length of the inertia track 464, or along one or more portions thereof. In some examples, the inertia track 464 is annular or spiral, depending on length, and the first opening 466 and the second opening 468 may be formed at varying circumferential positions from one another (e.g., 120°, 240°, 360°, 540°, etc.) to vary a path length of the first operating fluid 404 through the inertia track 464. The variation of the path length and/or cross-sectional area of the inertia track 464 permits tailoring of response characteristics of the orifice plate 430 to vehicle-specific design parameters for the example hydraulic mount 400.

The compression fit connection between the second connector 416 and the third connector 418 further secures outer circumferential portions of an example diaphragm 470 as a second compliance member, defining a flexible fluid boundary. The diaphragm 470, formed from a resilient material, such a natural rubber or synthetic rubber, extends along an inner surface of the outer housing portion 422 to a position beneath the orifice plate 430.

In the example shown in FIG. 4, the first chamber 406 and the second chamber 408 are defined in the hydraulic mount 400. The first chamber 406 is defined between the orifice plate 430 and interior surfaces of the first housing portion 401. The second chamber 408 is defined between the orifice plate 430 and the diaphragm 470, which forms a flexible fluid boundary for the second chamber 408.

In some examples, the first operating fluid 404 is a mixture of distilled water and ethylene glycol (e.g., 40% ethylene glycol, 50% ethylene glycol, 60% ethylene glycol, 70% ethylene glycol, etc.), a mixture of distilled water and propylene glycol, a mixture of distilled water and an alcohol, or synthetic motor oil, or a solute and solvent combination yielding a freezing-point depression suitable for use in a vehicle in a particular range of climates (e.g., freezing point above −50° C., freezing point above −40° C., freezing point above −30° C., etc.). In some examples, the first operating fluid 404 is selected to minimize temperature dependent viscosity changes to provide a consistent vehicle suspension dynamic response.

As a result of the compression or extension of the hydraulic mount 400, the first operating fluid 404 flows between the first chamber 406 and the second chamber 408 in a direction corresponding to a direction of the force to the first and fourth connectors 414, 424. In operation, elastic deformation of the example annular rubber main spring 410 and the example first mount 412 under an applied compressive or tensile force acts as a piston upon the first operating fluid 404 in the first chamber 406. Under a tensile force, for example, a negative pressure is developed in the first chamber 406 by movement of the annular rubber main spring 410 and the first mount 412, causing the first operating fluid 404 to flow from the second chamber 408 into the first chamber 406 through the inertia track 464 via the second opening 468.

To illustrate an example application of a tensile force to the hydraulic mount 400, a negative pressure in the first chamber 406 arising from application of a tensile force to the first and fourth connectors 414, 424 draws small volumes of the first operating fluid 404 from the second chamber 408 into the first chamber 406 and from the second sub-chamber 448 into the first chamber 406 via the lowest resistance flow paths, the second orifice 450 and the third orifice 460. Volumetric flow of the first operating fluid 404 through the second orifice 450 and the third orifice 460 is regulated by, for example, a selected orifice diameter and coefficient of discharge. Volumetric flow of the first operating fluid 404 through the second orifice 450 from the second sub-chamber 448 to the first chamber 406 is further regulated by a compliance of the second resilient member 446, with higher degrees of compliance (lower elastic modulus) facilitating a faster response and higher volumetric flow rates through the second orifice 450. The first orifice 442 is configured to accommodate small volume changes between the second chamber 408 and the first sub-chamber 440. The second orifice 450 is configured to accommodate small volume changes between the first chamber 406 and the second sub-chamber 448. The third orifice 460 is configured to accommodate small volume changes between the first chamber 406 and the second chamber 408. Vibrations or movements of the hydraulic mount 400 that cannot be accommodated by the first orifice 442, the second orifice 450 and/or the third orifice 460 are accommodated by the inertia track 464.

Low-amplitude, high frequency forces (e.g., vibrations, etc.) applied to the first and fourth connectors 414, 424 incur negligible volumetric flow of the first operating fluid 404 from the second chamber 408 to the first chamber 406 due to the higher resistance of the inertia track 464 flow path. If the flow path through the second orifice 450 and the third orifice 460 is not sufficient to equalize the pressure, a resistance of the inertia track 464 is overcome and a flow path is established from the second chamber 408 to the first chamber 406 through the inertia track 464.

Conversely, to illustrate an example application of a compressive force to the hydraulic mount 400, a positive pressure in the first chamber 406 arising from application of a compressive force to first and fourth connectors 414, 424 draws small volumes of the first operating fluid 404 from the first chamber 406 into the second chamber 408 and from the first sub-chamber 440 into the second chamber 408 via the lowest resistance flow paths, the first orifice 442 and the third orifice 460. As noted above, volumetric flow of the first operating fluid 404 through the first orifice 442 and the third orifice 460 is regulated by, for example, an orifice diameter, a coefficient of discharge and a compliance of the first resilient member 438. The example hydraulic mount 400 having the first resilient member 438, the second resilient member 446, the first orifice 442, the second orifice 450 and the third orifice 460, and the inertia track 464, offer additional degrees of freedom in isolation design optimization to tailor a dynamic response and damping characteristics, even in different directions of motion. For example, a compliance of the first resilient member 438 can be different from a compliance of the second resilient member 446, yielding a different characteristic response in a first direction (e.g., an extension or rebound direction) and a second direction (e.g., a compression direction). As another example, a difference in diameter and/or a coefficient of discharge between the first orifice 442 and the second orifice 450 yields a different characteristic response in the example first direction and the example second direction.

Further, positioning of the first resilient member 438, the first sub-chamber 440, and the first orifice 442 to communicate with the second chamber 408 and positioning of the second resilient member 446, the second sub-chamber 448, and the second orifice 450 to communicate with the first chamber 406 as shown in FIG. 4 ensures that the hydraulic mount 400 guarantees an initial open flow, or an initial low-resistance flow path, regardless of the whether an initial shock absorber motion is in compression or extension.

Figure 5:
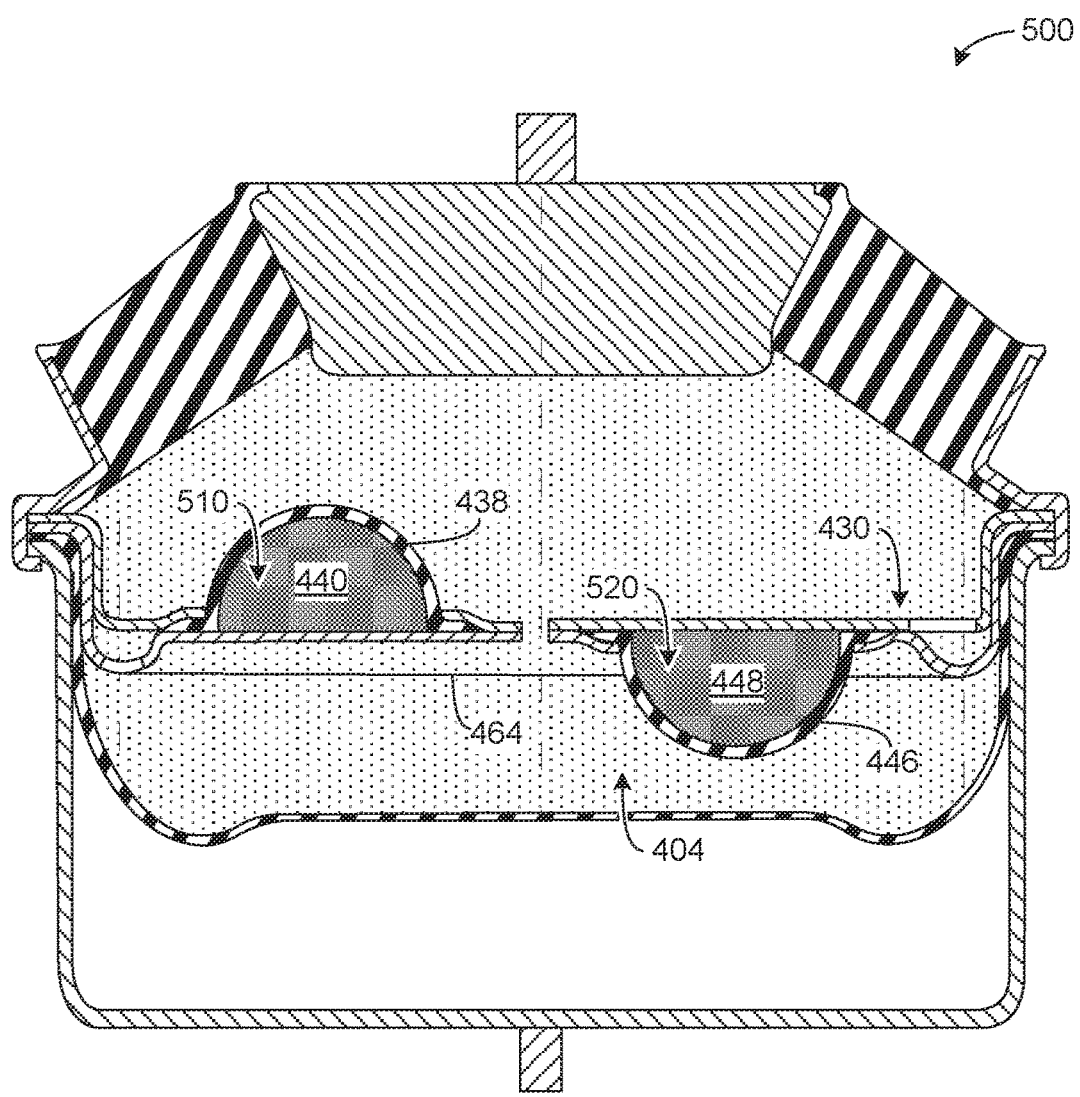
FIG. 5 is a second example hydraulic mount that may be used in the example shock absorbing apparatus of FIG. 3 in accordance with teachings of this disclosure.

FIG. 5 illustrates another example hydraulic mount 500 that may be integrated with a shock absorber, such as the example shock absorber 320 of FIG. 3. The example hydraulic mount 500 of FIG. 5 is similar to the example hydraulic mount 400 of FIG. 4, except for the omission of the first orifice 442 and the second orifice 450 in the orifice plate 430 of the hydraulic mount 500, which eliminates fluid communication between the first sub-chamber 440 and the second chamber 408 and between the second sub-chamber 448 and the first chamber 406. Accordingly, in FIG. 5, the first sub-chamber 440 retains a second operating fluid 510 and the second sub-chamber 448 retains a third operating fluid 520. In the example hydraulic mount 500, the second operating fluid 510 and the third operating fluid 520 include compressible fluids, which may be the same as, or different than, one another. In some examples, the second operating fluid 510 and/or the third operating fluid 520 include a gaseous mixture (e.g., air, etc.), nitrogen, or argon. In some examples, the second operating fluid 510 and/or the third operating fluid 520 include a two-phase fluid including both a liquid and a gas. Similar to the example hydraulic mount 400 of FIG. 4, the example hydraulic mount 500 may include the first resilient member 438 and the second resilient member 446 having different properties and/or characteristics (e.g., compliance, material, thickness, etc.). In some examples, the first sub-chamber 440 and/or the second sub-chamber 448 of the example hydraulic mount 500 of FIG. 5 are pressurized to a predetermined pressure. The first sub-chamber 440 and the second sub-chamber 448 may be pressurized to different predetermined pressures to provide a hydraulic mount 500 responding differently in different directions. In some examples, the predetermined pressure is a fraction of a pressure range experienced by the first operating fluid 404 during operation of the hydraulic mount 500. For example, if the first operating fluid 404 operates within a range of pressures between −15 psi and +15 psi, the first sub-chamber 440 and/or the second sub-chamber 448 are pressurized to a pressure that is a fraction of this range (e.g., 1 psi, 1.5 psi, 2 psi, 2.5 psi, etc.). Above this predetermined pressure of the sub-chamber(s) 440, 448, deformation of the first resilient member 438 and second resilient member 446 and compression of the operating fluid(s) 510, 520 within the sub-chamber(s) 440, 448 occurs, absorbing energy and reducing pressure in the respective chamber to thereby delay onset of flow of the first operating fluid 404 through the inertia track 464.

Figure 6:
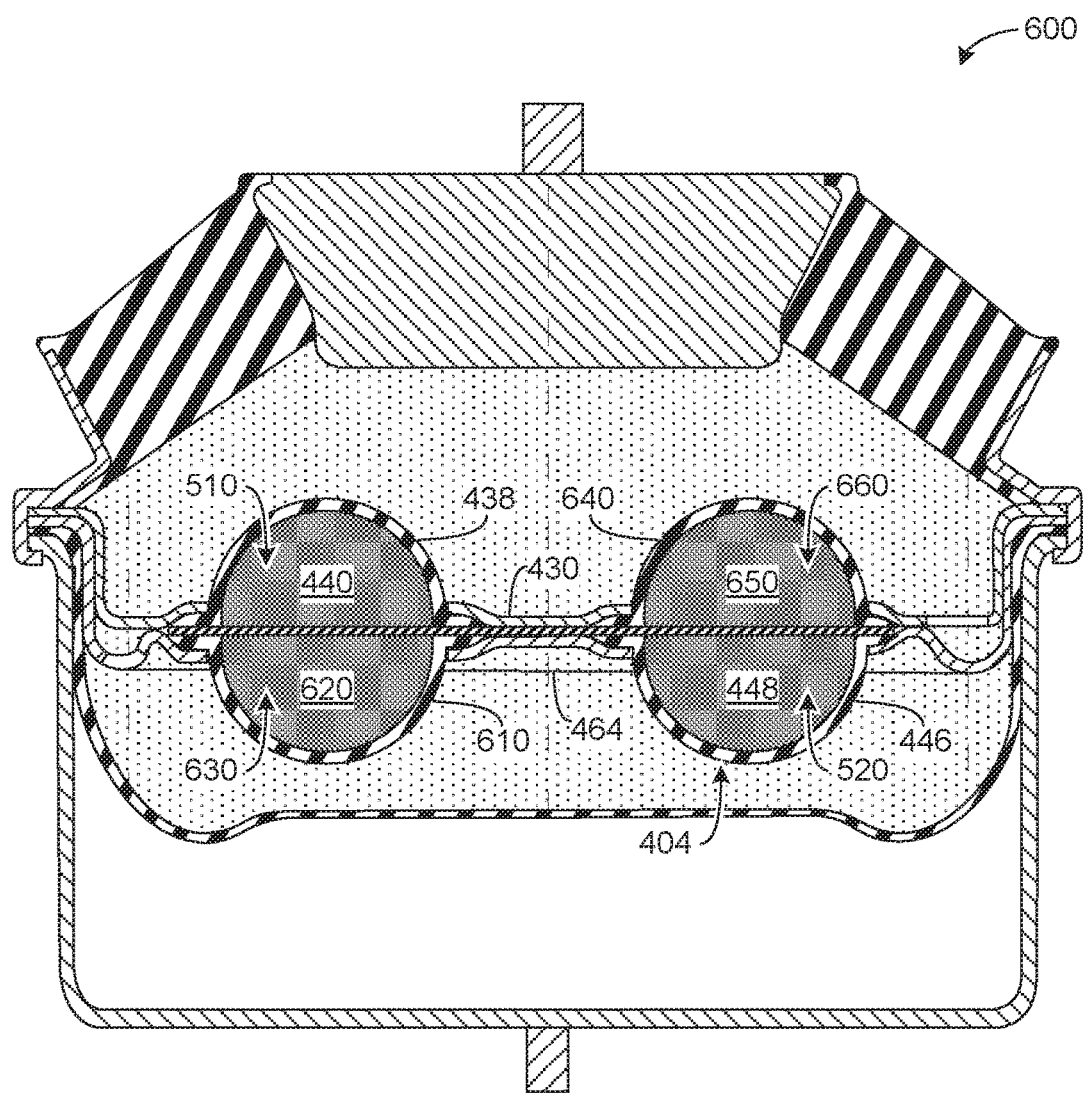
FIG. 6 is a third example hydraulic mount that may be used in the example shock absorbing apparatus of FIG. 3 in accordance with teachings of this disclosure.

FIG. 6 illustrates another example hydraulic mount 600 that may be integrated with a shock absorber, such as the example shock absorber 320 of FIG. 3. The example hydraulic mount 600 of FIG. 6 is similar to the example hydraulic mount 500 of FIG. 5, but includes a third resilient member 610 defining a third sub-chamber 620 containing a fourth operating fluid 630 and a fourth resilient member 640 defining a fourth sub-chamber 650 containing a fifth operating fluid 660. The third resilient member 610 and the third sub-chamber 620 are disposed on a side of an orifice plate 662 opposite to the first resilient member 438 and first sub-chamber 440 (e.g., in the second chamber 408, as shown in FIG. 6). The fourth resilient member 640 and the fourth sub-chamber 650 are disposed on a side of the orifice plate 662 opposite to the second resilient member 446 and second sub-chamber 448 (e.g., in the first chamber 406, as shown in FIG. 6). As with the example of FIG. 5, the fourth operating fluid 630 and the fifth operating fluid 660 include a compressible fluid, which may be the same as, or different than, one another. In some examples, the second operating fluid 510 and/or the third operating fluid 520 includes a gaseous mixture (e.g., air, etc.), nitrogen, or argon. In some examples, the second operating fluid 510 and/or the third operating fluid 520 includes a two-phase fluid including both a liquid and a gas. Similar to the example hydraulic mount 400 of FIG. 4, the example hydraulic mount 600 may include the first resilient member 438 and the second resilient member 446 having different properties and/or characteristics (e.g., compliance, material, thickness, etc.), such as to provide different dynamic behavior in different directions (e.g., a first behavior in extension and a second behavior in compression). In some examples, one or more of the first sub-chamber 440, the second sub-chamber 448, the third sub-chamber 620 and/or the fourth sub-chamber 650 of the example hydraulic mount 600 are pressurized to a predetermined pressure, which may be the same as, or different than one another to provide different dynamic behavior in different directions (e.g., a first behavior in extension and a second behavior in compression). Above this predetermined pressure of the sub-chambers 440, 448, 620, 650, deformation of the resilient members 438, 446, 610, 640 and compression of the operating fluids 510, 520, 630, 660 within the sub-chambers 440, 448, 620, 650 occurs, absorbing energy and reducing pressure in the respective chamber to thereby delay onset of flow of the first operating fluid 404 through the inertia track 464.

Figure 7:
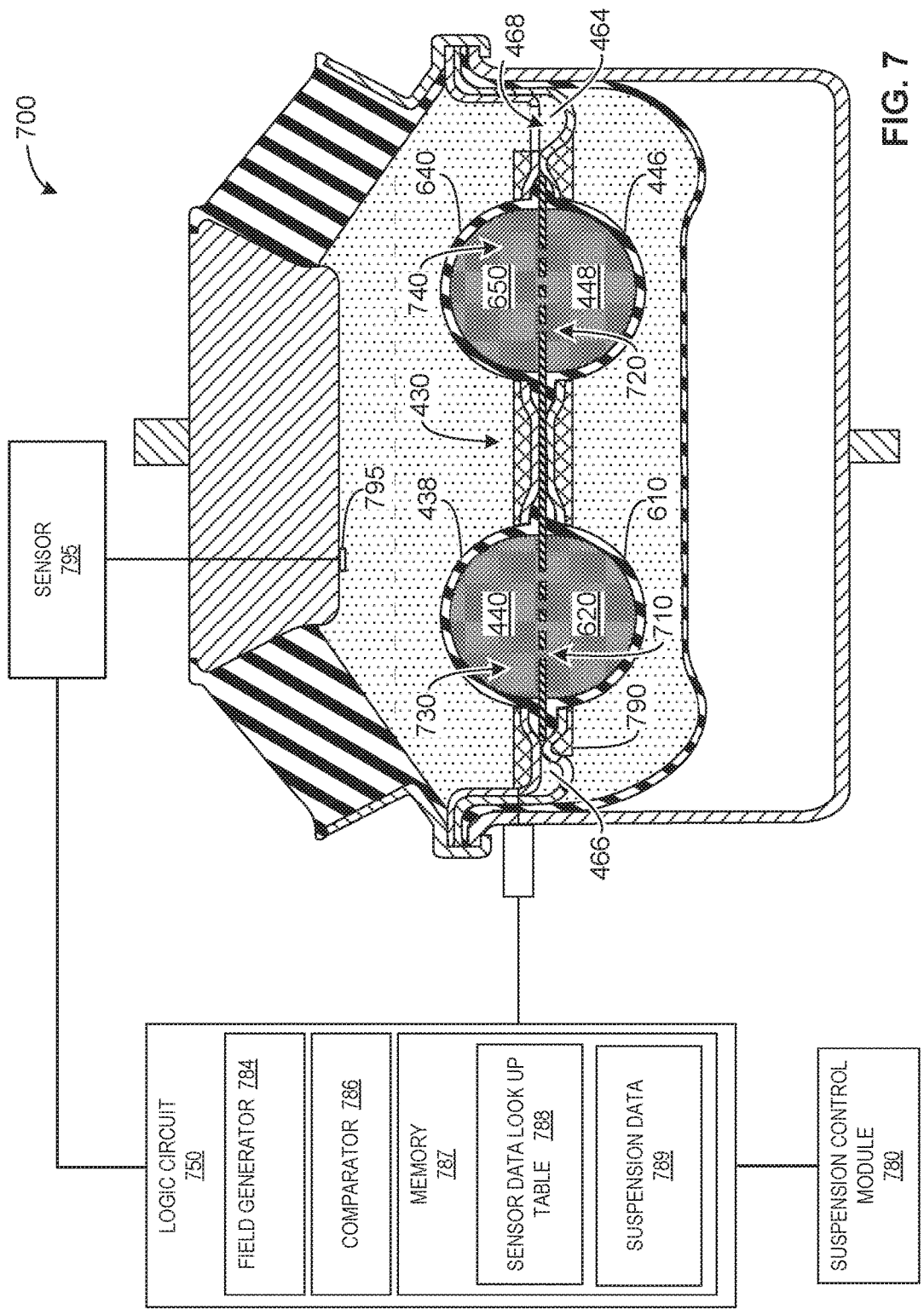
FIG. 7 is a fourth example hydraulic mount that may be used in the example shock absorbing apparatus of FIG. 3 in accordance with teachings of this disclosure.

FIG. 7 illustrates another example hydraulic mount 700 that may be integrated with a shock absorber, such as the example shock absorber 320 of FIG. 3. The example hydraulic mount 700 of FIG. 7 is similar to the example hydraulic mount 600 of FIG. 6, but includes a first orifice 710 in an orifice plate 712 between the first sub-chamber 440 and the third sub-chamber 620 and includes a second orifice 720 in the orifice plate 712 between the second sub-chamber 448 and the fourth sub-chamber 650. The first orifice 710 and/or the second orifice 720 may include more than one orifice. The first orifice 710 between the first sub-chamber 440 and the third sub-chamber 620 enables fluid communication of a second operating fluid 730 between these sub-chambers 440, 620. The orifice(s) 720 between the second sub-chamber 448 and the fourth sub-chamber 650 enables fluid communication of a third operating fluid 740 between these sub-chambers 448, 650. The second operating fluid 730 and the third operating fluid 740 may include a compressible fluid (e.g., a gaseous mixture, air, nitrogen, argon, etc.) or a non-compressible fluid. The second operating fluid 730 and the third operating fluid 740 may be the same or may be different.

Similar to the example hydraulic mount 600 of FIG. 6, the first resilient member 438, the second resilient member 446, the third resilient member 610 and/or the fourth resilient member 640 of the example hydraulic mount 700 of FIG. 7 may have different properties and/or characteristics (e.g., compliance, material, thickness, etc.), and the first and third sub-chambers 440, 620 and/or the second and fourth sub-chambers 448, 650 may have different properties and/or characteristics (e.g., different predetermined pressures, different fluids, different areas of the first orifice 710 and the second orifice 720, etc.), to provide different dynamic behavior in different directions (e.g., a first behavior in extension and a second behavior in compression). Combinations of such resilient member properties and/or characteristics and sub-chamber properties and/or characteristics are selectable to control an onset and a progression of deformation of the resilient members and flow of the operating fluids 730, 740 between the respective sub-chambers (440, 620 and 448, 650) to control hydraulic dampening within the example hydraulic mount 700.

In some examples, the second operating fluid 730 and/or the third operating fluid 740 of the example hydraulic mount 700 of FIG. 7 are electronically controllable fluids, such as an electrorheological fluid responsive to an applied electric field or a magnetorheological fluid responsive to an applied magnetic field. As noted above, the second operating fluid 730 and the third operating fluid 740 may be the same or may be different. Upon application of an electric field or a magnetic field, as appropriate to the electronically controllable fluid, an apparent viscosity of the electronically controllable fluid reversibly changes in proportion to an intensity of the applied field. Thus, the electronically controllable fluid (e.g., 730, 740) can be caused to transition, in milliseconds, from a first viscosity to a second viscosity by the logic circuit 750 of the hydraulic mount 700, which is to selectively control a viscosity of the electronically controllable fluid (e.g., 730, 740).

In the illustrated example of FIG. 7, the logic circuit 750 includes an example field generator 755, an example comparator 760, and an example memory 765 including a sensor data look up table 770 and suspension data 775. However, other example implementations of the logic circuit 750 may include fewer or additional structures. The logic circuit 750 is communicatively coupled to a suspension control module 780 of a vehicle.

In some examples, the example field generator 755 is an electric field generator to generate an electric field to cause a change in a characteristic (e.g., viscosity) of an electrorheological fluid via supporting structure, such as electrical conductors 790 (e.g., coiled conductors, plates, electrodes, etc.). The electrical conductors 790 may be disposed, for example, adjacent the inertia track 464 of the orifice plate 712 or an opening (e.g., 466, 468) thereto and/or along the first orifice 710 and the second orifice 720, across which a potential difference can be developed to alter a resistance to flow through the first opening 466 and the second opening 468 or the first orifice 710 and the second orifice 720. In some examples, the example field generator 755 is a magnetic field generator to generate a magnetic field to cause a change in a characteristic (e.g., viscosity) of a magnetorheological fluid via supporting structure, such as the electrical conductors 790 (e.g., coiled conductors).

In some examples, the logic circuit 750 is a closed-loop control system to cause the example field generator 755 to alter the characteristics of an electronically controllable fluid to correspond to a desired state of the hydraulic mount 700 at a particular moment during operation, such as during operation of a semi-active shock absorber utilizing the hydraulic mount 700 or during compression or tension of the hydraulic mount 700. The logic circuit 750 is communicatively coupled to a sensor 795 (e.g., a pressure sensor, a piezoelectric sensor, a frequency sensor, etc.) internal to the hydraulic mount 700 and/or external to the hydraulic mount 700 (e.g., a piezoelectric sensor integrated with, or external to, the diaphragm 470, etc.) to provide feedback to the logic circuit 750 corresponding to one or more variables directly or indirectly correlated to one or more conditions in the hydraulic mount 700. The example comparator 760 compares data from the sensor 795 to the corresponding look up table 770 for the sensor data in the example memory 765 and/or the suspension data 775 to determine whether an adjustment to the field generator 755 output is warranted.

The example comparator 760 of FIG. 7 may be implemented by a semiconductor device such as a processor, microprocessor, controller or microcontroller. The comparator 760 manages and/or controls the operation of the example logic circuit 750 of FIG. 7 based on data, information and/or one or more signal(s) obtained and/or accessed by the comparator 760 from the example sensor 795, or sensors (not shown) external to the hydraulic mount 700, and from the suspension control module 780.

The example memory 765 of FIG. 7 may be implemented by any type(s) and/or any number(s) of storage device(s) such as a storage drive, a flash memory, a read-only memory (ROM), a random-access memory (RAM), a cache and/or any other storage medium in which information is stored for any duration (e.g., for extended time periods, permanently, brief instances, for temporarily buffering, and/or for caching of the information). The information stored in the memory 765 may be stored in any file and/or data structure format, organization scheme, and/or arrangement. In some examples, the memory 765 stores use information and/or data (e.g., the sensor data look up table 770 of FIG. 7). The memory 765 is accessible to the example logic circuit 750, as well as an example suspension control module (SCM) 780.

While an example manner of implementing the example logic circuit 750 is illustrated in FIG. 7, one or more of the elements, processes and/or devices illustrated in FIG. 7 may be combined, divided, re-arranged, omitted, eliminated and/or implemented in any other way. Further, the example logic circuit 750, the example field generator 755, the example comparator 760 and the example memory 765 of FIG. 7 may be implemented by a semiconductor device such as a processor. The example logic circuit 750, the example field generator 755, the example comparator 760 and the example memory 765 of FIG. 7 may also be implemented by hardware, software, firmware and/or any combination of hardware, software and/or firmware. Thus, for example, any of the example logic circuit 750, the example field generator 755, the example comparator 760 and the example memory 765 of FIG. 7 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example logic circuit 750, the example field generator 755, the example comparator 760 and the example memory 765 of FIG. 7 is/are hereby expressly defined to include a tangible computer readable storage device or storage disk such as a memory, a digital versatile disk (DVD), a compact disk (CD), a Blu-ray disk, etc. storing the software and/or firmware. Further still, the example logic circuit 750 of FIG. 7 may include one or more elements, processes and/or devices in addition to, or instead of, those illustrated in FIG. 7, and/or may include more than one of any or all of the illustrated elements, processes and devices.

Figure 8:
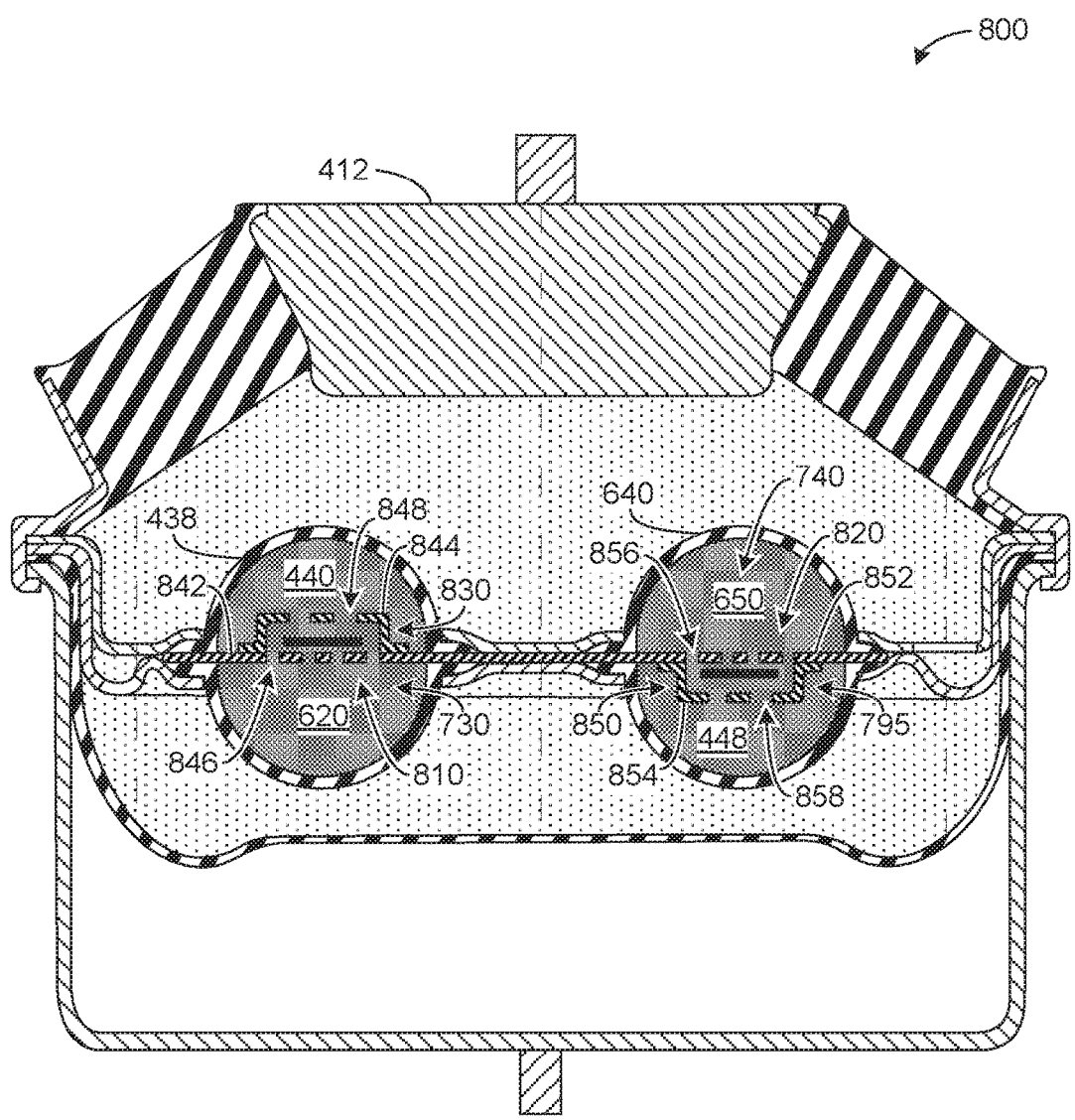
FIG. 8 is a fifth example hydraulic mount that may be used in the example shock absorbing apparatus of FIG. 3 in accordance with teachings of this disclosure.

FIG. 8 illustrates another example hydraulic mount 800 that may be integrated with a shock absorber, such as the example shock absorber 320 of FIG. 3. The example hydraulic mount 800 of FIG. 8 is structurally similar to the example hydraulic mount 700 of FIG. 7, but includes a first decoupler 810 within the first sub-chamber 440 and a second decoupler 820 within the second sub-chamber 448. The first decoupler 810 regulates flow of the second operating fluid 730 between the first sub-chamber 440 and the third sub-chamber 620. The second decoupler 820 regulates flow of the third operating fluid 740 between the second sub-chamber 448 and the fourth sub-chamber 650. The second operating fluid 730 and the third operating fluid 740 may be the same or may be different.

The orifice plate 822 of FIG. 8 defines, in a central portion of the first sub-chamber 440, a first cage 830 (e.g., a substantially cylindrical structure, etc.) having a first end 842 and a second end 844. The first decoupler 810 is housed and movably disposed within the first cage 830 to move between the first end 842 and the second end 844. The first cage 830 includes a first orifice 846 in the first end 842 and a second orifice 848 in the second end 844 to permit passage of the second operating fluid 730 therethrough. The first orifice 846 and the second orifice 848 may each include more than one orifice. The first decoupler 810 responds to pressure changes within the first sub-chamber 440 and the third sub-chamber 620 which, in turn, respond to pressure changes within the first chamber 406 and the second chamber 408. Movement of the first decoupler 810 within the first cage 830 toward and away from the first end 842 and the second end 844 accommodates movement of small volume changes between the first sub-chamber 440 and the third sub-chamber 620 responsive to such pressure changes.

The orifice plate 822 of FIG. 8 likewise defines, in a central portion of the second sub-chamber 448, a second cage 850 (e.g., a substantially cylindrical structure, etc.) having a first end 852 and a second end 854. The second decoupler 820 is housed and movably disposed within the second cage 850 to move between the first end 852 and the second end 854. The second cage 850 includes a third orifice 856 in the first end 852 and a fourth orifice 858 in the second end 854 to permit passage of the third operating fluid 740 therethrough. The third orifice 856 and the fourth orifice 858 may each include more than one orifice. The second decoupler 820 responds to pressure changes within the second sub-chamber 448 and the fourth sub-chamber 650 which, in turn, respond to pressure changes within the first chamber 406 and the second chamber 408. Movement of the second decoupler 820 within the second cage 850 toward and away from the first end 852 and the second end 854 accommodates movement of small volume changes between the second sub-chamber 448 and the fourth sub-chamber 650 responsive to such pressure changes.

It can be observed in FIG. 8 that a position of the first decoupler 810 in the first cage 830 is different than a position of the second decoupler 820 in the second cage 850. In FIG. 8, the first decoupler 810 is adjacent the first end 842 of the first cage 830 in a position occluding the first orifice 846, whereas the second decoupler 820 is adjacent the first end 852 of the second cage 850 in a position occluding the third orifice 856. This difference is attributable to the design of the first decoupler 810 and the second decoupler 820. The first decoupler 810 has a density greater than a density of the second operating fluid 730 to bias the first decoupler 810 toward a first default position adjacent the first end 842 of the first cage 830 in a position occluding the first orifice 846. In some examples, the second operating fluid 730 and/or the third operating fluid 740 are mixtures of distilled water and ethylene glycol with a density between 1.00 g/cm$^3$-1.113 g/cm$^3$. In an example where the density of the second operating fluid 730 and the third operating fluid 740 is 1.06 g/cm$^3$, a density of an example first decoupler 810 is greater than 1.06 g/cm$^3$ (e.g., 1.08 g/cm$^3$-1.2 g/cm$^3$) and an example density of the second decoupler 820 is less than 1.06 g/cm$^3$ (e.g., 0.90 g/cm$^3$-1.05 g/cm$^3$). Thus, in this example, the first decoupler 810 tends to sink within the first cage 830 toward a default position at the first end 842 of the first cage 830 and the second decoupler 820 tends to rise within the first cage 830 toward a default position at the first end 852 of the second cage 850, such as is shown in FIG. 8. In some examples, the first decoupler 810 and/or the second decoupler 820 include an elastomeric material. In some examples, the second decoupler 820 comprises a composite material such as a composite of an elastomeric material and a low density core (e.g., cork, wood, etc.) to lower a density of the second decoupler 820 relative to the third operating fluid 740.

During compression of the example hydraulic mount 800, the example first mount 412 is axially displaced in a first direction to compress the first operating fluid 404, correspondingly compressing the first resilient member 438 and the fourth resilient member 640. The response of the first resilient member 438 and the fourth resilient member 640 will differ if the characteristics of the first resilient member 438 and the fourth resilient member 640 are different and/or the characteristics of the first sub-chamber 440 and the fourth sub-chamber 650 are different (e.g., different resilient member material compliance, different sub-chamber pressure, different densities of the second operating fluid 730 and the third operating fluid 740, etc.). In the first sub-chamber 440, in the orientation shown in FIG. 8, the second operating fluid 730 is prevented from flowing from the first sub-chamber 440 to the third sub-chamber 620 by the first decoupler 810, which is initially positioned to occlude the first orifice 846. In the second sub-chamber 448, the second decoupler 820 is initially positioned to occlude the third orifice 856. Responsive to the increased pressure in the fourth sub-chamber 650, the second decoupler 820 is pushed away from the third orifice 856 to create a temporary low resistance flow path for the third operating fluid 740 to flow from the fourth sub-chamber 650 to the second sub-chamber 448. At a certain pressure, according to the particular design of the hydraulic mount 800, the second decoupler 820 engages the fourth orifice 858 at the second end 854 of the second cage 850, blocking flow of the third operating fluid 740 therethough.

At this point, the first decoupler 810 engages the first orifice 846 and the second decoupler 820 engages the fourth orifice 858, blocking flow of the first operating fluid 404 through the first cage 830 and the second cage 850. The pressure difference between the first chamber 406 and the second chamber 408 is, however, sufficient to overcome a resistance of the inertia track 464, to drive flow of the first operating fluid 404 from the first chamber 406 to the second chamber 408 through the inertia track 464 and to filter out higher frequency vibrations.

During extension of the example hydraulic mount 800, the example first mount 412 is axially displaced in a second direction, causing a decrease in pressure of the first operating fluid 404, correspondingly expanding the first resilient member 438 and the fourth resilient member 640 to cause a decrease in pressure in the first sub-chamber 440 and the fourth sub-chamber 650. The response of the first resilient member 438 and the fourth resilient member 640 will differ if the characteristics of the first resilient member 438 and the fourth resilient member 640 are different and/or the characteristics of the first sub-chamber 440 and the fourth sub-chamber 650 are different (e.g., different resilient member material compliance, different sub-chamber pressure, different densities of the second operating fluid 730 and the third operating fluid 740, etc.).

In the first sub-chamber 440, the first decoupler 810 is initially in a position to occlude the first orifice 846. Responsive to the decreased pressure in the first sub-chamber 440, the first decoupler 810 is pulled away from the third orifice 856 to create a temporary low resistance flow path for the second operating fluid 730 to flow from the third sub-chamber 620 to the first sub-chamber 440. In the fourth sub-chamber 650, the third operating fluid 740 is prevented from flowing from the second sub-chamber 448 to the fourth sub-chamber 650 by the second decoupler 820, which moves to occlude the third orifice 856 responsive to the pressure difference between the fourth sub-chamber 650 and the second sub-chamber 448. At a certain pressure, according to the particular design of the hydraulic mount 800, the first decoupler 810 engages the second orifice 848 at the second end 844 of the first cage 830, blocking flow therethough.

At this point, the first decoupler 810 engages the second orifice 848 and the second decoupler 820 engages the third orifice 856, blocking flow of the first operating fluid 404 through the first cage 830 and the second cage 850. The pressure difference between the second chamber 408 and the first chamber 406 is, however, sufficient to overcome a resistance of the inertia track 464, to drive flow of the first operating fluid 404 from the second chamber 408 to the first chamber 406 through the inertia track 464 to filter out higher frequency vibrations.

Figure 9:
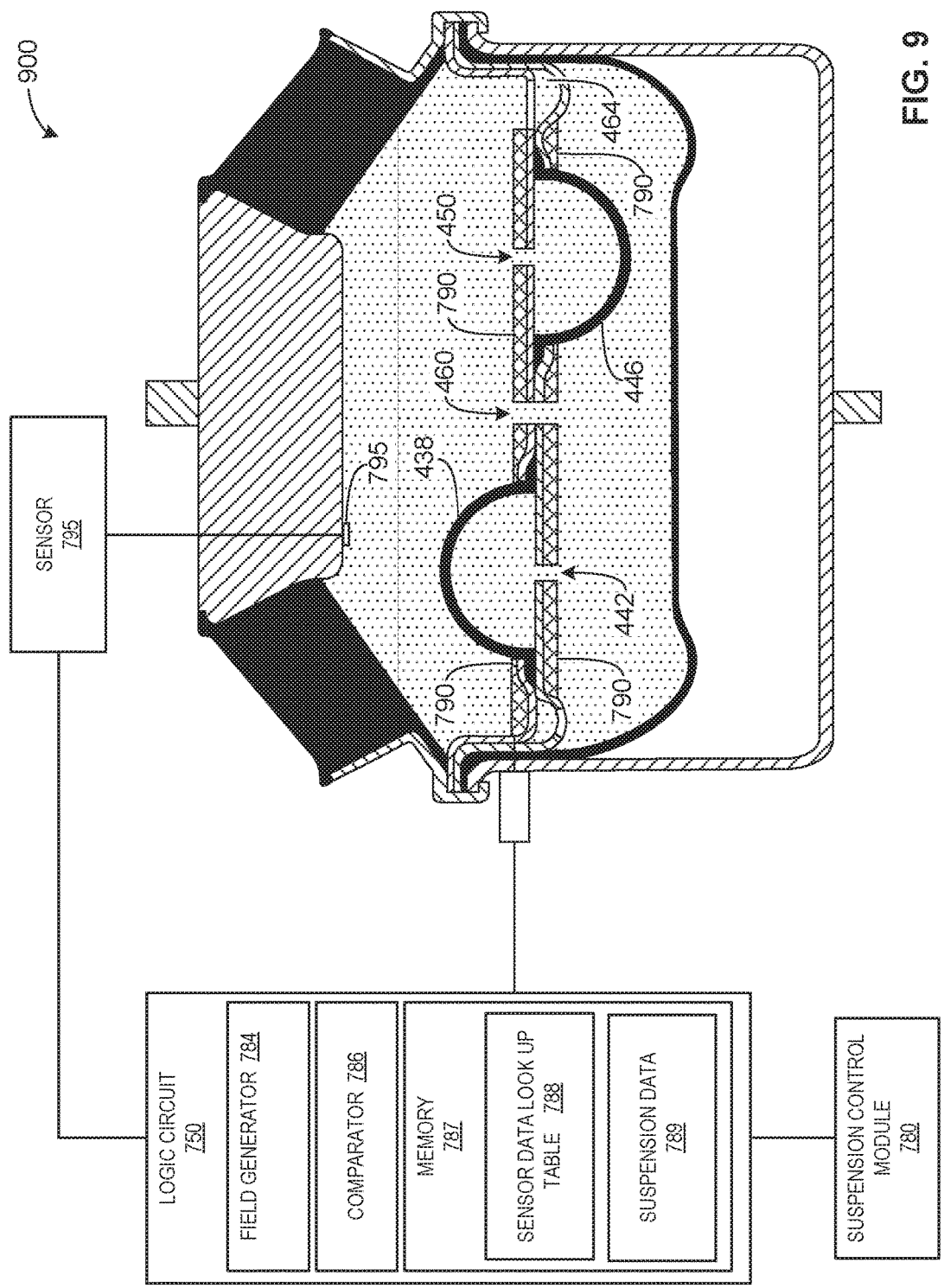
FIG. 9 is a sixth example hydraulic mount that may be used in the example shock absorbing apparatus of FIG. 3 in accordance with teachings of this disclosure.

FIG. 9 illustrates another example hydraulic mount 900 that may be integrated with a shock absorber, such as the example shock absorber 320 of FIG. 3. The example hydraulic mount 900 of FIG. 9 is structurally similar to the example hydraulic mount 400 of FIG. 4, but includes an electronically controllable fluid as the first operating fluid 404 (e.g., an electrorheological fluid, a magnetorheological fluid, etc.).

The example hydraulic mount 900 also includes, the example logic circuit 750 including, in some examples, the example field generator 755, the example comparator 760, and the example memory 765. Other example implementations of the logic circuit 750 may include fewer or additional structures. As with the example hydraulic mount 700 of FIG. 7, the example field generator 755 of the example hydraulic mount 900 of FIG. 9 may include an electric field generator to generate an electric field or a magnetic field generator to generate a magnetic field to correspondingly cause a change in a characteristic (e.g., viscosity) of the electronically controllable fluid via supporting structure, such as electrical conductors 790 (e.g., coiled conductors, plates, electrodes, etc.).

In the example hydraulic mount 900 of FIG. 9, the example electrical conductors 790 are coiled about the first orifice 442, the second orifice 450 and the third orifice 460 of the orifice plate 910. Application of alternating current (AC) through the electrical conductors 790, via the field generator 755, creates a magnetic field with field lines aligned along an axis of the first orifice 442, the second orifice 450 and/or the third orifice 460. The magnetic field alters a characteristic (e.g., viscosity, etc.) of the first operating fluid 404, a magnetorheological fluid in this example, within a region of the generated magnetic field.

In some examples, the logic circuit 750 is a closed-loop control system to cause the characteristics of an electronically controllable fluid to correspond to a desired state of the hydraulic mount 900 at a particular moment during operation, such as during operation of a semi-active shock absorber utilizing the hydraulic mount 900. As shown in FIG. 9, the logic circuit 750 may be communicatively coupled to the sensor 795 (e.g., a pressure sensor, a piezoelectric sensor, a frequency sensor, etc.) internal to the hydraulic mount 900 and/or external to the hydraulic mount 900 (e.g., a piezoelectric sensor integrated with, or external to, a diaphragm 470, etc.) to provide feedback to the logic circuit 750 corresponding to one or more variables directly or indirectly correlated to one or more conditions in the hydraulic mount 900. The example comparator 760 compares data from the sensor 795 to a corresponding look up table 770 for the sensor data in the example memory 765 and/or suspension data 775 to determine whether an adjustment to the field generator 755 output is warranted.

Figure 10:
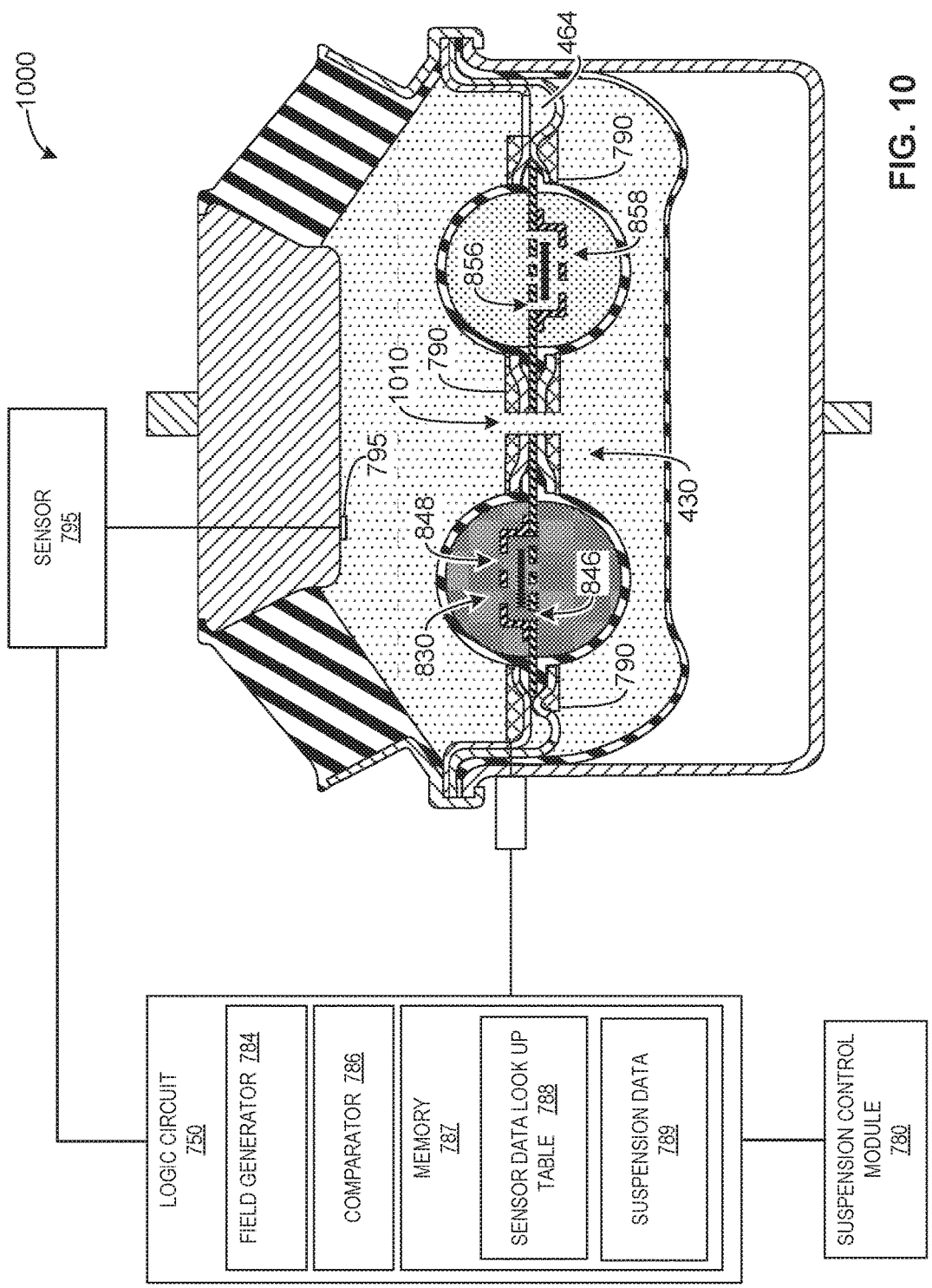
FIG. 10 is a seventh example hydraulic mount that may be used in the example shock absorbing apparatus of FIG. 3 in accordance with teachings of this disclosure.

FIG. 10 illustrates another example hydraulic mount 1000 that may be integrated with a shock absorber, such as the example shock absorber 320 of FIG. 3. The example hydraulic mount 1000 of FIG. 10 is structurally similar to the example hydraulic mount 800 of FIG. 8, but includes an electronically controllable fluid (e.g., an electrorheological fluid, a magnetorheological fluid, etc.) as the second operating fluid 730 and/or the third operating fluid 740 and further includes an orifice 1010 formed in a central portion of the orifice plate 1020.

The example hydraulic mount 1000 also includes the example logic circuit 750 including, in some examples, the example field generator 755, the example comparator 760, and the example memory 765 communicatively coupled to the sensor 795 and the suspension control module 780. Other example implementations of the logic circuit 750 may include fewer or additional structures.

As with the example hydraulic mount 800 of FIG. 8, the example field generator 755 of the example hydraulic mount 1000 of FIG. 10 may include an electric field generator to generate an electric field or a magnetic field generator to generate a magnetic field to correspondingly cause a change in a characteristic (e.g., viscosity) of the electronically controllable fluid via supporting structure, such as the electrical conductors 790 (e.g., coiled conductors, plates, electrodes, etc.).

In the example of FIG. 10, the electrical conductors 790 are coiled about the orifice 1010 in the central portion of the orifice plate 1020. Application of alternating current through the electrical conductors 790, via the field generator 755, creates a magnetic field with field lines aligned along an axis of the orifice 1010 to alter a characteristic (e.g., viscosity, etc.) of the first operating fluid 404, a magnetorheological fluid in this example, within a region of the generated magnetic field.

In some examples, the logic circuit 750 is a closed-loop control system to cause the characteristics of an electronically controllable fluid to correspond to a desired state of the hydraulic mount 1000 at a particular moment during operation, such as during operation of a semi-active shock absorber utilizing the hydraulic mount 1000. As shown in FIG. 10, the logic circuit 750 may be communicatively coupled to the sensor 795 internal to the hydraulic mount 1000 and/or external to the hydraulic mount 1000 to provide feedback to the logic circuit 750 corresponding to one or more variables directly or indirectly correlated to one or more conditions in the hydraulic mount 1000. The example comparator 760 compares data from the a sensor 795 to a corresponding look up table 770 for the sensor data in the example memory 765 and/or suspension data 775 to determine whether an adjustment to the field generator 755 output is warranted.

Figure 11:
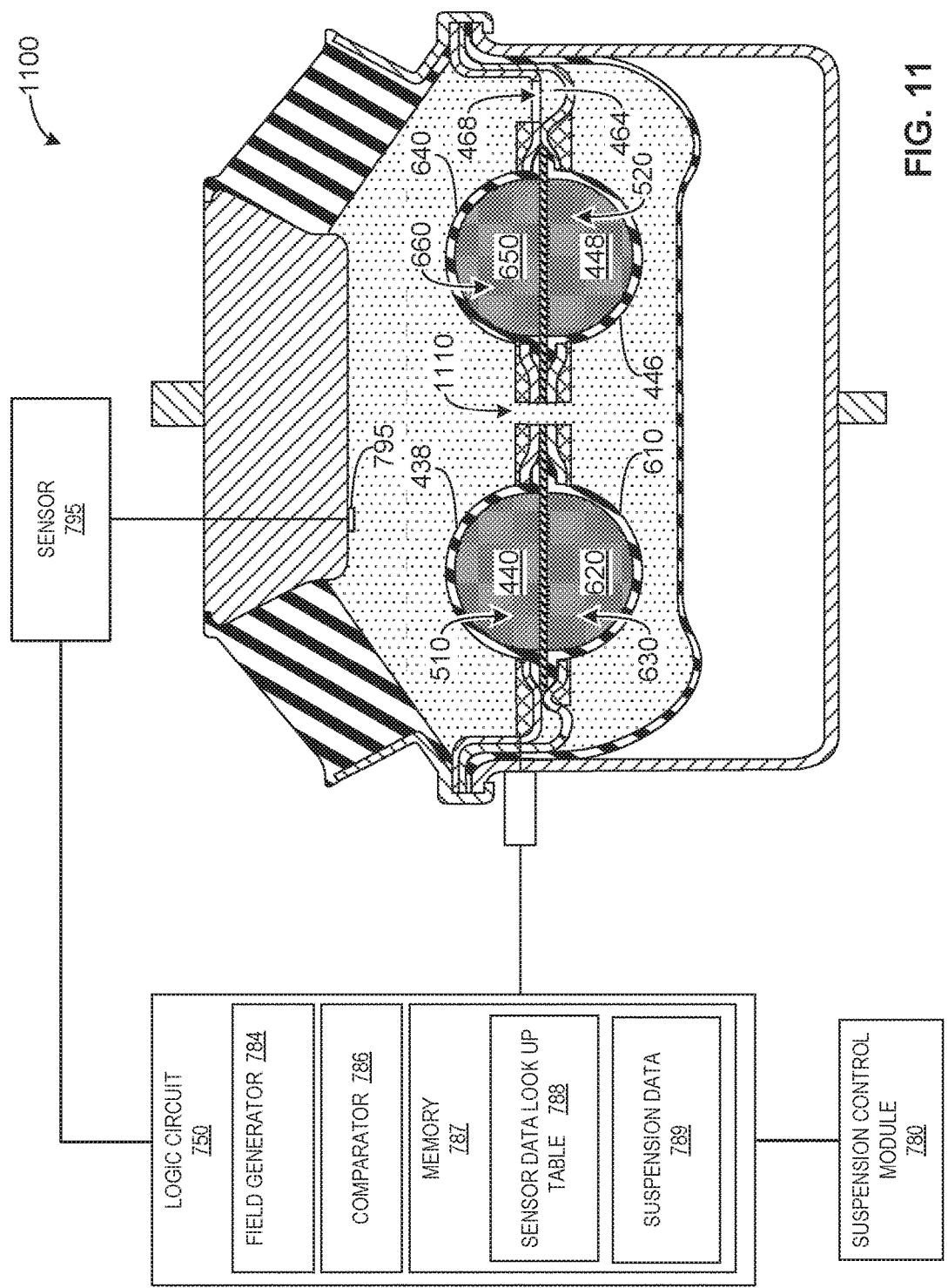
FIG. 11 is an eighth example hydraulic mount that may be used in the example shock absorbing apparatus of FIG. 3 in accordance with teachings of this disclosure.

FIG. 11 illustrates another example hydraulic mount 1100 that may be integrated with a shock absorber, such as the example shock absorber 320 of FIG. 3. The example hydraulic mount 1100 of FIG. 11 is structurally similar to the example hydraulic mount 600 of FIG. 6, but uses an electronically controllable fluid (e.g., an electrorheological fluid, a magnetorheological fluid, etc.) as the first operating fluid 404 and includes an orifice 1110 formed in a central portion of the orifice plate 1120. In some examples, orifices may be formed in the orifice plate 1120 between the first sub-chamber 440 and third sub-chamber 620 and between the second sub-chamber 448 and the fourth sub-chamber 650 to permit fluid communication between the respective sub-chambers. Likewise, in such example, the operating fluid in the first sub-chamber 440 and the third sub-chamber 620 are the same and the operating fluid in the second sub-chamber 448 and the fourth sub-chamber 650 are the same.

The example hydraulic mount 1100 also includes the example logic circuit 750 including, in some examples, the example field generator 755, the example comparator 760, and the example memory 765 communicatively coupled to the sensor 795 and the suspension control module 780. Other example implementations of the logic circuit 750 may include fewer or additional structures. As with the example hydraulic mount 700 of FIG. 7, the example field generator 755 of the example hydraulic mount 1100 of FIG. 11 may include an electric field generator to generate an electric field or a magnetic field generator to generate a magnetic field to correspondingly cause a change in a characteristic (e.g., viscosity) of the electronically controllable fluid via supporting structure, such as the electrical conductors 790 (e.g., coiled conductors, plates, electrodes, etc.). In the example shown in FIG. 11, the electrical conductors 790 are coiled conductors disposed circumferentially about the first resilient member 438, the second resilient member 446, the third resilient member 610 and the fourth resilient member 640 to generate a magnetic field having field lines passing through the orifice 1110 formed in the central portion of the orifice plate 1120 to control a characteristic (e.g., viscosity, etc.) of the first operating fluid 404 in the region of the orifice 1110 to thereby control an effect of the orifice 1110.

In some examples, the logic circuit 750 is a closed-loop control system to cause the characteristics of an electronically controllable fluid to correspond to a desired state of the hydraulic mount 1000 at a particular moment during operation, such as during operation of a semi-active shock absorber utilizing the hydraulic mount 1100. As shown in FIG. 11, the logic circuit 750 may be communicatively coupled to the sensor 795 internal to the hydraulic mount 1100 and/or external to the hydraulic mount 1100 to provide feedback to the logic circuit 750 corresponding to one or more variables directly or indirectly correlated to one or more conditions in the hydraulic mount 1100. The example comparator 760 compares data from the sensor 795 to a corresponding look up table 770 for the sensor data in the example memory 765 and/or suspension data 775 to determine whether an adjustment to the field generator 755 output is warranted.

A flowchart representative of an example method 1200 for implementing the example logic circuit 750 of FIG. 7 to dynamically alter an operation of the hydraulic mount 700 of FIG. 7, the hydraulic mount 900 of FIG. 9, the hydraulic mount 1000 of FIG. 10 or the hydraulic mount 1100 of FIG. 11.

Figure 12:
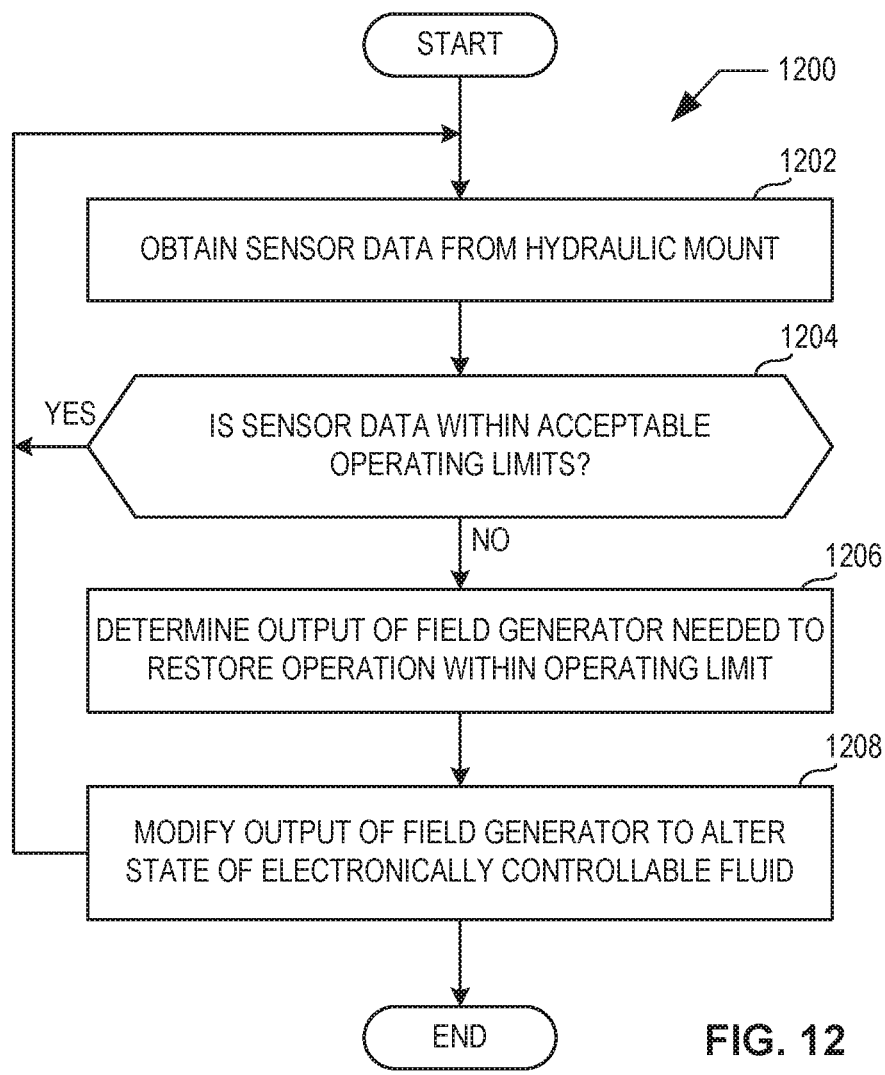
FIG. 12 is a flowchart of an example method in accordance with teachings of this disclosure.

In the example of FIG. 12, the method 1200 may be implemented using machine-readable instructions that comprise one or more program(s) for execution by a processor such as the example processor 1312 of the example processor platform 1300 discussed below in connection with FIG. 13. The one or more program(s) may be embodied in software stored on a tangible computer readable storage medium such as a CD-ROM, a floppy disk, a hard drive, a digital versatile disk (DVD), a Blu-ray disk, or a memory associated with the processor 1312, but the entire program(s) and/or parts thereof could alternatively be executed by a device other than the processor 1312 and/or embodied in firmware or dedicated hardware. Further, although the example program(s) is/are described with reference to the flowchart illustrated in FIG. 12, many other methods for implementing the example logic circuit 750 to dynamically alter an operation of the hydraulic mount (e.g., 700, 900, 1000, 1100, etc.) may alternatively be used. For example, the order of execution of the blocks may be changed, and/or some of the blocks described may be changed, eliminated, or combined.

As mentioned above, the example method 1200 of FIG. 12 to dynamically alter an operation of the hydraulic mount (e.g., 700, 900, 1000, 1100, etc.) may be implemented using coded instructions (e.g., computer and/or machine-readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term "tangible computer readable storage medium" is expressly defined to include any type of computer readable storage device and/or storage disk and to exclude propagating signals and to exclude transmission media. As used herein, "tangible computer readable storage medium" and "tangible machine readable storage medium" are used interchangeably.

Additionally or alternatively, the example method 1200 of FIG. 12 may be implemented using coded instructions (e.g., computer and/or machine-readable instructions) stored on a non-transitory computer and/or machine-readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term "non-transitory computer readable medium" is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

The example method 1200 begins at block 1202 when the example logic circuit 750 receives sensor data from the example sensor 795 of the example hydraulic mount (e.g., 700, 900, 1000, 1100, etc.). At block 1204, the measured sensor data is compared, via the comparator 760, to sensor data values in the memory 765 sensor data look up table 770 to determine if the measured sensor data is within acceptable operating limits for the sensor data. Block 1204 may further include comparing data received from the suspension control module 780 to suspension data 775 in the memory 765 via the example comparator 760. If, at block 1204, if the measured sensor data is within acceptable operating limits for the sensor data, control passes to block 1202 for continued monitoring of sensor data from the example sensor 795. If, at block 1204, the measured sensor data is not within acceptable operating limits for the sensor data, control passes to block 1206.

In block 1206, the example logic circuit 750 determines an output of the example field generator 755 needed to restore the example hydraulic mount (e.g., 700, 900, 1000, 1100, etc.) to a state within operating limits set within the memory 765 (e.g., within the example sensor data look up table 770 and/or within the suspension data 775) or set by the suspension control module 780. Thus, for example, the example logic circuit 750 is to determine whether a viscosity of the second operating fluid 730 and/or the third operating fluid 740 should be reduced or increased by the field generator 755 to alter a viscosity of the electronically controllable fluid to yield a desired dampening characteristic of the hydraulic mount to return the example hydraulic mount (e.g., 700, 900, 1000, 1100, etc.) to operation within acceptable operating limits. In block 1208, the logic circuit 750 then instructs the field generator 755 to generate a field (e.g., a magnetic field, etc.) at block 1206 to return the example hydraulic mount (e.g., 700, 900, 1000, 1100, etc.) to operation within acceptable operating limits.

Figure 13:
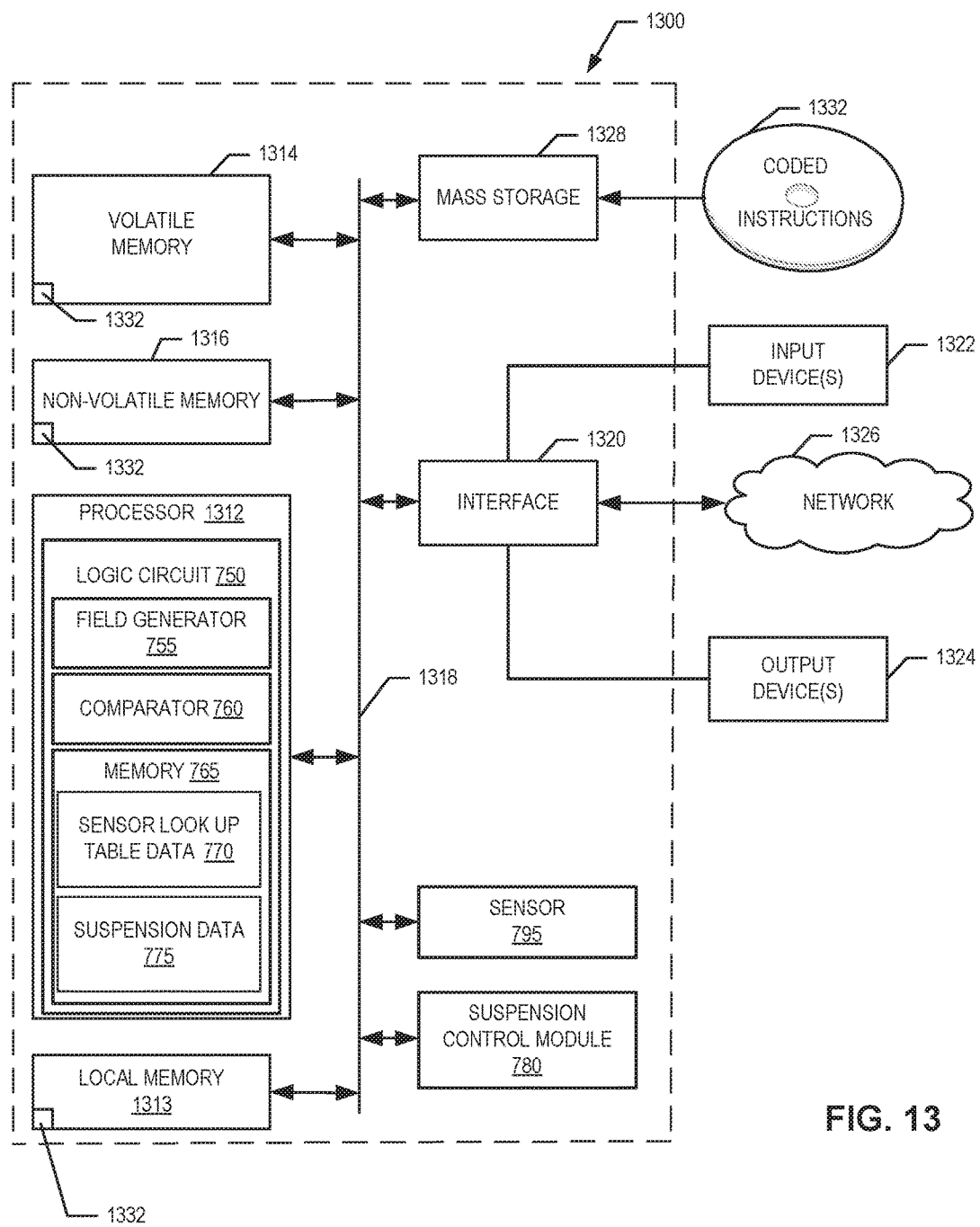
FIG. 13 is a block diagram of an example processor platform that may execute instructions to implement the method of FIG. 12.

FIG. 13 is an example processor platform 1300 capable of executing instructions to implement the method 1200 of FIG. 12 and the example logic circuit 750 of FIGS. 7 and 9-11. The processor platform 1300 of the illustrated example includes a processor 1312. The processor 1312 of the illustrated example is hardware. For example, the processor 1312 can be implemented by one or more integrated circuit(s), logic circuit(s), processor(s), microprocessor(s), controller(s) or microcontroller(s) from any desired family or manufacturer. The processor 1312 of the illustrated example includes a local memory 1313 (e.g., a cache). In the illustrated example, the processor 1312 includes the example logic circuit 750, the example field generator 755, the example comparator 760, the example memory 765, the example sensor data look up table 770 and the example suspension data 775 of FIG. 7.

The processor 1312 of the illustrated example is in communication with the example sensor 795 and the suspension control module 780 of FIGS. 7 and 9-11 via a bus 1318. The processor 1312 of the illustrated example is also in communication with a main memory including a volatile memory 1314 and a non-volatile memory 1316 via the bus 1318. The volatile memory 1314 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1316 may be implemented by flash memory and/or any other desired type of memory device. Access to the volatile memory 1314 and the non-volatile memory 1316 is controlled by a memory controller.

The processor 1312 of the illustrated example is also in communication with one or more mass storage devices 1328 for storing software and/or data. Examples of such mass storage devices 1328 include floppy disk drives, hard drive disks, compact disk drives, Blu-ray disk drives, RAID systems, and digital versatile disk (DVD) drives.

The processor platform 1300 of the illustrated example also includes an interface circuit 1320. The interface circuit 1320 may be implemented by any type of interface standard, such as an Ethernet interface, a universal serial bus (USB), and/or a PCI express interface. In the illustrated example, one or more input device(s) 1322 are connected to the interface circuit 1320. The input device(s) 1322 permit(s) a user to enter data and commands into the processor 1312. The input device(s) 1322 can be implemented by, for example, an audio sensor, a camera (still or video), a keyboard, a button, a mouse, a touchscreen, a track-pad, a trackball, isopoint, a voice recognition system, a microphone, and/or a liquid crystal display. One or more output device(s) 1324 are also connected to the interface circuit 1320 of the illustrated example. The output device(s) 1324 can be implemented, for example, by a light emitting diode, an organic light emitting diode, a liquid crystal display, a touchscreen and/or a speaker. The interface circuit 1320 of the illustrated example may, thus, include a graphics driver such as a graphics driver chip and/or processor. The interface circuit 1320 may be implemented by any type of interface standard, such as an Ethernet interface, a universal serial bus (USB), and/or a PCI express interface to enable communication via the input device(s) 1322, output device(s), bus 1318 and connected circuits and components, and network 1326 (e.g., a vehicle network, a cellular network, a wireless local area network (WLAN), etc.).

Coded instructions 1332 for implementing the method of FIG. 12 may be stored in the local memory 1313, in the volatile memory 1314, in the non-volatile memory 1316, in the mass storage device 1328, and/or on a removable tangible computer readable storage medium such as a CD or DVD.

In still additional examples, rather than providing a plurality of decouplers in the manner disclosed having different densities than an operating fluid or fluids, one or more biasing elements (e.g., a spring, a plurality of springs, etc.) can be mounted in the cages (e.g., in the first cage 830 and/or second cage 850 of FIG. 8) to bias the decouplers in a desired direction. In some examples, to account for a compression height of the spring(s), the decouplers may advantageously be provided with protuberances dimensioned to contact and occlude the orifices in the cage to provide a desired flow isolation function at a desired dynamic state. Accordingly, while use of decouplers having different densities is one manner in which the decouplers may be positioned in different positions to ensure an initial open flow and low-resistance flow path for the disclosed combination of a shock absorber and a hydraulic mount, regardless of the whether an initial shock absorber motion is in compression or extension, other conventional manners of positioning the decouplers are considered to fall within the present disclosure.

In another example, rather than providing a diaphragm (e.g., 470 of FIG. 4) as a movable fluid boundary, a piston may be used to provide a movable fluid boundary.

From the foregoing, it will be appreciated that the disclosed apparatus and methods for controlling a hydraulic mount including an electronically controllable fluid, provide advantages over known approaches for isolating vibrations in vehicles to improve secondary ride. The disclosed apparatus and method provide new options for isolating vibration, such as road noise, and for improving secondary ride.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A hydraulic mount for a vehicle shock absorber, comprising:
 a first housing portion, a second housing portion, an orifice plate, and a diaphragm connected together to define a first chamber and a second chamber in the hydraulic mount, the orifice plate having an orifice disposed centrally on the orifice plate to fluidly couple the first chamber to the second chamber;
 a first resilient member disposed on a first portion of the orifice plate to define a first sub-chamber in the first chamber;
 a second resilient member disposed on a second portion of the orifice plate to define a second sub-chamber in the second chamber;
 a first decoupler disposed in a first cage in the first sub-chamber, the first cage to restrict movement of the first decoupler; and
 a second decoupler disposed in a second cage in the second sub-chamber, the second cage to restrict movement of the second decoupler.

2. The hydraulic mount of claim 1, further including:
 an orifice plate inertia track defining a fluid pathway between the first chamber and the second chamber; and
 a first operating fluid to flow between the first chamber and the second chamber, via the inertia track, during compression or extension of the hydraulic mount.

3. The hydraulic mount of claim 2, further including a second operating fluid in at least one of the first sub-chamber or the second sub-chamber, the second operating fluid being different than the first operating fluid.

4. The hydraulic mount of claim 3,
wherein the first sub-chamber includes the second operating fluid, and
wherein the second sub-chamber includes a third operating fluid different than the first operating fluid and the second operating fluid.

5. The hydraulic mount of claim 4, further including:
a third resilient member disposed on the orifice plate to define, in the second chamber, a third sub-chamber; and
a fourth resilient member disposed on the orifice plate to define, in the first chamber, a fourth sub-chamber.

6. The hydraulic mount of claim 5, wherein the first sub-chamber includes the second operating fluid, the second sub-chamber includes the third operating fluid, the third sub-chamber includes a fourth operating fluid and the fourth sub-chamber includes a fifth operating fluid.

7. The hydraulic mount of claim 6, wherein at least one of the second operating fluid, the third operating fluid, the fourth operating fluid and the fifth operating fluid is different from another one of the second operating fluid, the third operating fluid, the fourth operating fluid and the fifth operating fluid.

8. The hydraulic mount of claim 7, wherein one or more of the second operating fluid, the third operating fluid, the fourth operating fluid and the fifth operating fluid includes a gas.

9. The hydraulic mount of claim 6, wherein one or more orifices are formed in the orifice plate to permit fluid communication between the first resilient member and the third resilient member, and wherein the second operating fluid and the fourth operating fluid are the same.

10. The hydraulic mount of claim 9, wherein one or more orifices are formed in the orifice plate to permit fluid communication between the second resilient member and the fourth resilient member, and wherein the third operating fluid and the fifth operating fluid are the same.

11. A hydraulic mount for a vehicle shock absorber, comprising:
a first housing portion, a second housing portion, an orifice plate, and a diaphragm connected together to define a first chamber and a second chamber in the hydraulic mount;
a first resilient member disposed on the orifice plate to define a first sub-chamber in the first chamber;
a second resilient member disposed on the orifice plate to define a second sub-chamber in the second chamber;
an orifice plate inertia track defining a fluid pathway between the first chamber and the second chamber;
a first operating fluid to flow between the first chamber and the second chamber, via the inertia track, during compression or extension of the hydraulic mount;
a second operating fluid in first sub-chamber, the second operating fluid being different than the first operating fluid;
a third operating fluid in the second sub-chamber, the third operating fluid being different than the first operating fluid and the second operating fluid;
a third resilient member disposed on the orifice plate to define, in the second chamber, a third sub-chamber;
a fourth resilient member disposed on the orifice plate to define, in the first chamber, a fourth sub-chamber;
a first decoupler disposed in the first sub-chamber, wherein the first decoupler has a density greater than a density of the second operating fluid to bias the first decoupler toward a bottom of the first sub-chamber, and
a second decoupler disposed in the second sub-chamber, wherein the second decoupler has a density less than the density of the third operating fluid to bias the second decoupler toward a top of the second sub-chamber.

12. The hydraulic mount of claim 6, wherein at least one of the second operating fluid, third operating fluid, fourth operating fluid or fifth operating fluid includes an electronically controllable fluid.

13. The hydraulic mount of claim 12, further including a field generator to generate a field to alter a viscosity of the electronically controllable fluid to alter a dampening characteristic of the hydraulic mount.

14. The hydraulic mount of claim 1, wherein the hydraulic mount is tuned to isolate frequencies of vibration between about 30 Hz and about 100 Hz.

15. The hydraulic mount of claim 1, wherein the first resilient member and the second resilient member have different elastic moduli.

16. A vehicular shock absorbing apparatus, comprising:
a shock absorber; and
a hydraulic mount operatively coupled with the shock absorber, the hydraulic mount including a first resilient member disposed on an orifice plate, a second resilient member disposed on the orifice plate, a first decoupler, a second decoupler, and a diaphragm, the hydraulic mount defining a first chamber and a second chamber, the first resilient member defining a first sub-chamber in the first chamber, the second resilient member defining a second sub-chamber in the second chamber, the first decoupler disposed in the first sub-chamber and having a density greater than a first operating fluid included in the first sub-chamber, the second decoupler disposed in the second sub-chamber and having a density less than a second operating fluid included in the second sub-chamber, and wherein the orifice plate has an orifice disposed centrally on the orifice plate to fluidly couple the first chamber to the second chamber.

17. The apparatus of claim 16, further including:
an inertia track defining a fluid pathway between the first chamber and the second chamber of the hydraulic mount; and
a third operating fluid to flow between the first chamber and the second chamber, via the inertia track, during compression or extension of the hydraulic mount.

18. The apparatus of claim 17, wherein the second operating fluid is different than the first operating fluid.

19. The hydraulic mount of claim 11, wherein the orifice plate includes a first orifice to fluidly couple the first sub-chamber to the third sub-chamber and a second orifice to fluidly couple the second sub-chamber to the fourth sub-chamber.

20. The vehicular shock absorbing apparatus of claim 16, wherein the hydraulic mount further includes a third resilient member disposed on the orifice plate to define, in the second chamber, a third sub-chamber, and a fourth resilient member disposed on the orifice plate to define, in the first chamber, a fourth sub-chamber.

* * * * *